US012535753B2

(12) United States Patent
Oguro

(10) Patent No.: US 12,535,753 B2
(45) Date of Patent: Jan. 27, 2026

(54) EXPOSURE DEVICE AND IMAGE FORMING APPARATUS

(71) Applicant: CANON KABUSHIKI KAISHA, Tokyo (JP)

(72) Inventor: Yu Oguro, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/761,617

(22) Filed: Jul. 2, 2024

(65) Prior Publication Data

US 2025/0021032 A1 Jan. 16, 2025

(30) Foreign Application Priority Data

Jul. 13, 2023 (JP) ................................ 2023-114886

(51) Int. Cl.
*G03G 15/04* (2006.01)
*G03G 21/18* (2006.01)
*G03G 21/20* (2006.01)

(52) U.S. Cl.
CPC . *G03G 15/04036* (2013.01); *G03G 15/04054* (2013.01); *G03G 21/1821* (2013.01); *G03G 21/206* (2013.01); *G03G 2215/0409* (2013.01); *G03G 2221/1645* (2013.01)

(58) Field of Classification Search
CPC .......... G03G 15/04036; G03G 21/206; G03G 15/04054; G03G 15/04063; G03G 2221/1645; G03G 2221/1636; G03G 2215/0407; G03G 2215/0409; G03G 2215/0412; G03G 2215/0421; G03G 21/1666; G03G 21/1821
See application file for complete search history.

(56) References Cited

U.S. PATENT DOCUMENTS

| | | | | |
|---|---|---|---|---|
| 5,119,143 A * | 6/1992 | Shimura | G03G 15/2064 | 399/329 |
| 2008/0152399 A1* | 6/2008 | Umeda | G03G 15/161 | 399/307 |
| 2010/0020301 A1* | 1/2010 | Sugiyama | G03G 15/326 | 355/67 |
| 2010/0054812 A1* | 3/2010 | Matsuura | G03G 15/04 | 156/60 |

(Continued)

FOREIGN PATENT DOCUMENTS

JP 2021074943 A 5/2021

*Primary Examiner* — Stephanie E Bloss
*Assistant Examiner* — Laura Roth
(74) *Attorney, Agent, or Firm* — ROSSI, KIMMS & McDOWELL LLP

(57) ABSTRACT

An exposure device includes a substrate on which a plurality of light emitting elements that emits light to expose the photosensitive member is arranged in the axial direction; a lens array configured to collect the light emitted from the light emitting elements on the photosensitive member; a housing configured to hold the substrate and the lens array; and a housing support member configured to support the housing. Ends of the housing and the housing support member in a longitudinal direction are bonded with a first adhesive, other ends of the housing and the housing support member in the longitudinal direction are bonded with a second adhesive, and a hardness of the first adhesive after curing is higher than a hardness of the second adhesive after curing.

14 Claims, 19 Drawing Sheets

(56) References Cited

U.S. PATENT DOCUMENTS

| | | | | |
|---|---|---|---|---|
| 2010/0054831 | A1* | 3/2010 | Sakanobe | G03G 21/0029 399/351 |
| 2015/0293494 | A1* | 10/2015 | Tanaka | G03G 21/206 399/92 |
| 2016/0375699 | A1* | 12/2016 | Yamamura | B41J 2/45 347/258 |
| 2018/0364613 | A1* | 12/2018 | Momoka | G03G 15/04036 |
| 2019/0310462 | A1* | 10/2019 | Yoshimura | G03G 15/043 |
| 2021/0165339 | A1* | 6/2021 | Takahashi | G03G 15/60 |

* cited by examiner

EXPOSURE DEVICE AND IMAGE FORMING APPARATUS

BACKGROUND OF THE INVENTION

Field of the Invention

The present invention relates to an exposure device that exposes a photosensitive member and an image forming apparatus including the exposure device.

Description of the Related Art

Hitherto, as an exposure head used in an electrophotographic system image forming apparatus, there is known an exposure head including a substrate on which a plurality of light emitting elements is arranged in an axial direction of a photosensitive member, a lens that collects light emitted from the plurality of light emitting elements, and a holder that holds the substrate and the lens. In the exposure head, light emitted from the plurality of light emitting elements is collected through the lens to expose the photosensitive drum.

In an image forming apparatus including the exposure head, a thermal expansion difference occurs in the exposure head such as the light emitting element, a lens array, and a housing that holds the light emitting element and the lens array due to heat generation of the substrate at the time of light emission, and there is a possibility that optical characteristics are affected.

Therefore, in Japanese Patent Application Laid-Open No. 2021-74943, the substrate on which the light emitting element is mounted is provided with a heat dissipation member that is in contact with a facing surface of the housing that holds the substrate, so that heat is efficiently dissipated from the housing, thereby suppressing deformation of the substrate and the lens array.

However, to suppress deformation of the substrate, the lens array, and the housing due to heat generation of the substrate and to reduce a temperature rise in the exposure head, relaying only on the above-described heat dissipation member is insufficient, and a cooling mechanism for cooling the substrate is required.

Therefore, it is conceivable to provide a housing support member that supports the housing in the exposure head and cool the substrate by an airflow. At this time, the housing support member through which the airflow flows needs to be fixed to the housing to secure a strength from the viewpoint of ease of assembly of the exposure head and positioning on a body. Since the housing support member is fixed to the housing, deformation due to a thermal expansion difference between the housing and the housing support member may induce deformation of the substrate and the lens array, affecting optical characteristics.

SUMMARY OF THE INVENTION

A representative configuration of the present invention is an exposure device that has an elongated shape extending in an axial direction of a photosensitive member and exposes the photosensitive member, the exposure device including: a substrate on which a plurality of light emitting elements that emits light to expose the photosensitive member is arranged in the axial direction; a lens array configured to collect the light emitted from the light emitting elements on the photosensitive member; a housing configured to hold the substrate and the lens array; and a housing support member configured to support the housing, in which one ends of the housing and the housing support member in a longitudinal direction are bonded with a first adhesive, the other ends of the housing and the housing support member in the longitudinal direction are bonded with a second adhesive, and a hardness of the first adhesive after curing is higher than a hardness of the second adhesive after curing.

Further features of the present invention will become apparent from the following description of exemplary embodiments with reference to the attached drawings.

DESCRIPTION OF THE EMBODIMENTS

Hereinafter, exemplary embodiments for carrying out the present invention will be described with reference to the drawings. However, the components described in the following description are merely examples, and the present invention is not limited to the embodiments described in the following description.

First Embodiment (Image Forming Apparatus)

Figure 1:
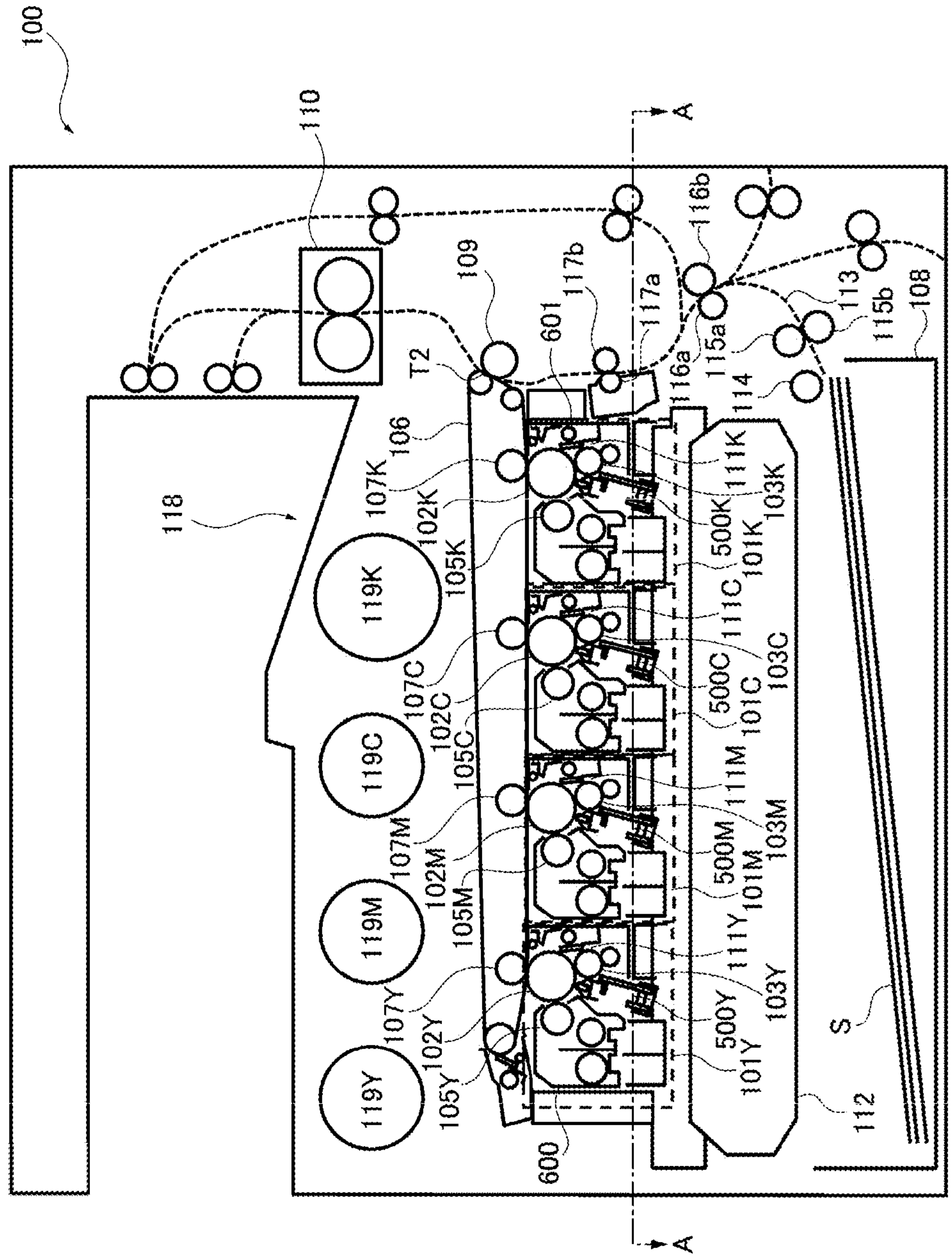
FIG. 1 is a cross-sectional view illustrating a schematic configuration of an image forming apparatus.
Figure 2:
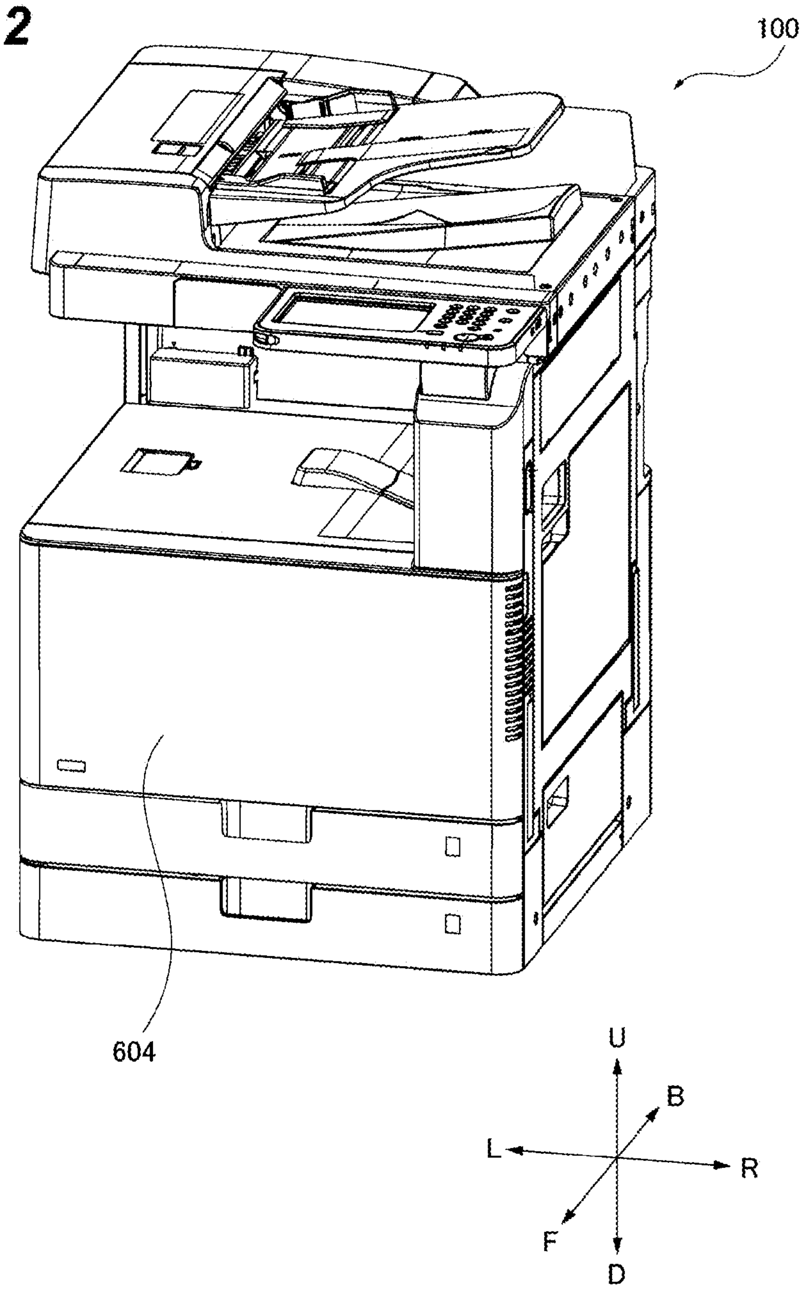
FIG. 2 is an external perspective view of the image forming apparatus.

First, a schematic configuration of an image forming apparatus 100 will be described. FIG. 1 is a cross-sectional view illustrating the schematic configuration of the image forming apparatus. FIG. 2 is an external perspective view of the image forming apparatus. Although the image forming apparatus illustrated in FIGS. 1 and 2 is an image forming apparatus including a reading device, the image forming apparatus does not have to include a reading device. In the embodiments, the image forming apparatus is not limited to a so-called tandem type color image forming apparatus including a plurality of photosensitive drums as illustrated in FIG. 1, and may be a color image forming apparatus including one photosensitive drum or an image forming apparatus that forms a monochrome image.

The image forming apparatus 100 illustrated in FIG. 1 includes four image forming portions 101Y, 101M, 101C, and 101K (hereinafter, also collectively and simply referred to as "image forming portion 101") that form toner images of respective colors of yellow, magenta, cyan, and black.

The image forming portions 101Y, 101M, 101C, and 101K include photosensitive drums 102Y, 102M, 102C, and 102K (hereinafter, also collectively and simply referred to as "photosensitive drum 102"), respectively, the photosensitive drums 102Y, 102M, 102C, and 102K being examples of photosensitive members (image bearing members). The photosensitive drums are arranged while being spaced apart from each other. The photosensitive drum may be a photosensitive belt.

The image forming portions 101Y, 101M, 101C, and 101K include chargers 103Y, 103M, 103C, and 103K (hereinafter, collectively and simply referred to as "charger 103"), respectively, the chargers 103Y, 103M, 103C, and 103K serving as charging portions that respectively charge the photosensitive drums 102Y, 102M, 102C, and 102K.

The image forming portions 101Y, 101M, 101C, and 101K include light emitting diode (hereinafter, referred to as LEDs) exposure units 500Y, 500M, 500C, and 500K (hereinafter, also collectively and simply referred to as "exposure unit 500"), respectively, the LED exposure units 500Y, 500M, 500C, and 500K serving as exposure portions that emit light for exposing the photosensitive drums 102Y, 102M, 102C, and 102K.

Further, the image forming portions 101Y, 101M, 101C, and 101K include development devices 105Y, 105M, 105C, and 105K (hereinafter, also collectively and simply referred to as "development device 105"), respectively, the development devices 105Y, 105M, 105C, and 105K each serving as a development portion that develops an electrostatic latent image on the photosensitive drum 102 with a toner and develop the toner image of each color on the photosensitive drum 102. Y, M, C, and K attached to the reference numerals indicate the colors of the toner.

The image forming apparatus 100 illustrated in FIG. 1 is an image forming apparatus of a so-called "lower surface exposure system" that exposes the photosensitive drum 102 from below. In the image forming apparatus 100 adopting the lower surface exposure system, the exposure unit 500 is disposed below the photosensitive drum 102. Hereinafter, a description will be given on the premise of the image forming apparatus adopting the lower surface exposure system. Although not illustrated, an image forming apparatus adopting an "upper surface exposure system" that exposes the photosensitive drum from above may be used as an embodiment.

The image forming apparatus 100 includes an intermediate transfer belt 106 to which the toner image formed on the photosensitive drum 102 is transferred, and primary transfer rollers 107Y, 107M, 107C, and 107K (hereinafter, also collectively and simply referred to as "primary transfer roller 107") that sequentially transfer the toner images formed on the photosensitive drums 102 to the intermediate transfer belt. In addition to an intermediate transfer method using the intermediate transfer belt, a direct transfer method of directly transferring from the photosensitive drum to a sheet may be used.

In addition, the image forming apparatus 100 includes a secondary transfer roller 109 that transfers the toner image on the intermediate transfer belt 106 to a recording material S conveyed from a sheet feeding portion 108, and a fixing device 110 that fixes the secondarily transferred image to the recording material S.

The toners remain on the surfaces of the photosensitive drums 102Y, 102M, 102C, and 102K after the primary transfer. The residual toners are removed by drum cleaning devices 111Y, 111M, 111C, and 111K (hereinafter, also collectively and simply referred to as "drum cleaning device 111"), and are collected in a collected toner container 112.

In addition, the toner also remains on the surface of the intermediate transfer belt 106 after the secondary transfer. The residual toner is removed by a belt cleaning device and collected in the collected toner container 112.

In addition, the image forming apparatus 100 includes a duct unit 606 (see FIGS. 11 and 12) that is detachable. The duct unit 606 is disposed below the image forming portion 101 and above the sheet feeding portion 108. The duct unit 606 is an exposure cooling unit that communicates with the exposure unit 500 and cools the exposure unit 500 (exposure head 104) with an airflow.

(Image Forming Process)

Next, an image forming process of the image forming apparatus 100 will be briefly described. The charger 103Y charges the surface of the photosensitive drum 102Y. The exposure unit 500Y exposes the surface of the photosensitive drum 102Y charged by the charger 103Y. As a result, the electrostatic latent image is formed on the photosensitive drum 102Y. Next, the development device 105Y develops the electrostatic latent image formed on the photosensitive drum 102Y with the yellow toner. The yellow toner image developed on the surface of the photosensitive drum 102Y is transferred onto the intermediate transfer belt 106 by the primary transfer roller 107Y. The magenta, cyan, and black toner images are also formed by a similar image forming process and transferred so as to be superimposed on each other on the intermediate transfer belt 106.

The toner image of each color transferred onto the intermediate transfer belt 106 is conveyed to a secondary transfer portion T2 by the intermediate transfer belt 106. The toner image conveyed to the secondary transfer portion T2 is transferred to the recording material S conveyed from the sheet feeding portion (sheet feeding cassette) 108 by the secondary transfer roller 109.

The recording material S is stored in a form of being stacked in the sheet feeding portion 108, and is fed to a conveyance path 113 according to an image forming timing. In a sheet feeding method, a leading edge of the recording material S is flipped up by friction of a sheet feeding roller 114, and only one sheet of recording material S is conveyed to the conveyance path 113 by a pair of sheet separation conveying rollers 115*a* and 115*b* for preventing double feeding of the recording materials S. Thereafter, the recording material S conveyed by a pair of conveying rollers 116*a* and 116*b* passes through the conveyance path 113 and is conveyed to a pair of registration rollers 117*a* and 117*b*, and is temporarily stopped. Skew feeding correction or timing correction is performed for the recording material S by the pair of registration rollers 117*a* and 117*b*, and then, the recording material S is conveyed to the secondary transfer portion T2.

The recording material S to which the toner image has been transferred in the secondary transfer portion T2 is conveyed to the fixing device 110. The fixing device 110 fixes the toner image on the recording material S by heat and pressure. The recording material S on which the toner image has been fixed by the fixing device 110 is discharged to a sheet discharge portion 118.

As illustrated in FIG. 1, the image forming apparatus 100 includes toner containers 119Y, 119M, 119 C, and 119 K (hereinafter, also collectively and simply referred to as a "toner container 119"). As image formation is performed, the amount of toner in the developing unit 600 (described below) decreases. At this time, the toners are supplied from the toner containers 119Y, 119M, 119C, and 119K provided corresponding to the respective image forming portions 101Y, 101M, 101C, and 101K to the developing unit 600 (described below). That is, in the developing unit 600 (described below) included in the image forming apparatus 100 according to the present embodiment, while a new toner is supplied from the toner container 119, a part of the excessive toner is conveyed to the collected toner container 112 as the residual toner.

(Drum Unit and Developing Unit)

A drum unit 601, which is an example of a replaceable replacement unit, is attached to the image forming apparatus 100 of the present embodiment. The drum unit 601 is a cartridge to be replaced by an operator such as a user or a maintenance person. The drum unit 601 (Y, M, C, and K) of the present embodiment includes the photosensitive drum 102 (Y, M, C, and K) rotatably supported with respect to a frame body of the drum unit 601.

In addition, the developing unit 600 separate from the drum unit 601 is attached to the image forming apparatus 100 of the present embodiment. The developing unit 600 of the present embodiment is a cartridge in which the development device 105 illustrated in FIG. 1 and a toner storage portion are integrated. The development device 105 includes a developing sleeve that is a developer bearing member that bears a developer. The developing unit 600 is provided with a plurality of gears for rotating screws for stirring the toner and a carrier. When the gears deteriorate over time or the like, the operator removes the developing unit 600 from an apparatus body of the image forming apparatus 100 and replaces the developing unit 600. Further, a certain amount of toner is removed as the residual toner from the developing unit 600, and is conveyed to the collected toner container 112. The drum unit 601 and the developing unit 600 may be implemented by a process cartridge in which the drum unit 601 and the developing unit 600 are integrated.

Figure 6:
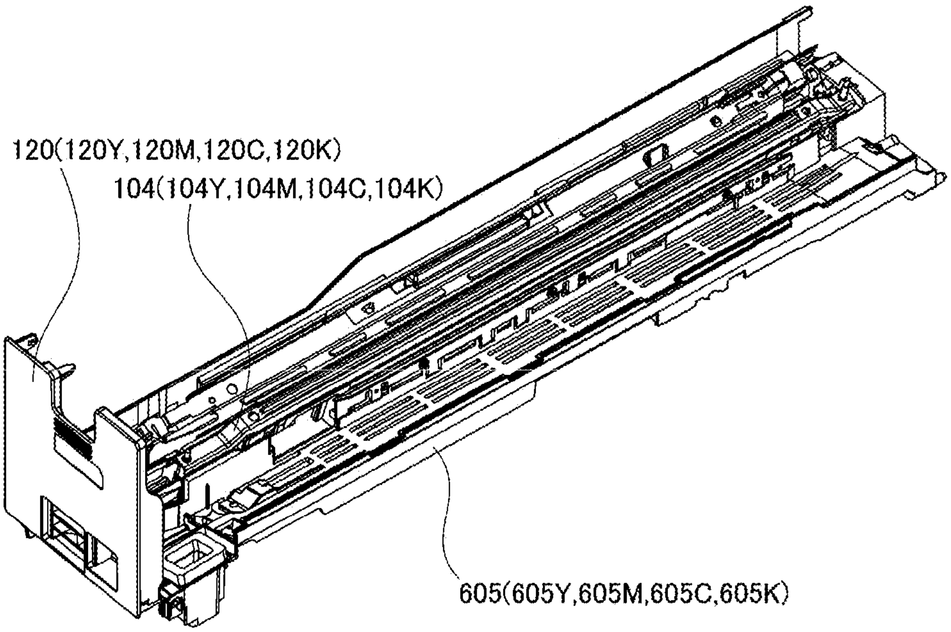
FIG. 6 is a perspective view illustrating a cartridge tray, an inner door in a closed state, and the exposure head at an exposure position.
Figure 7:
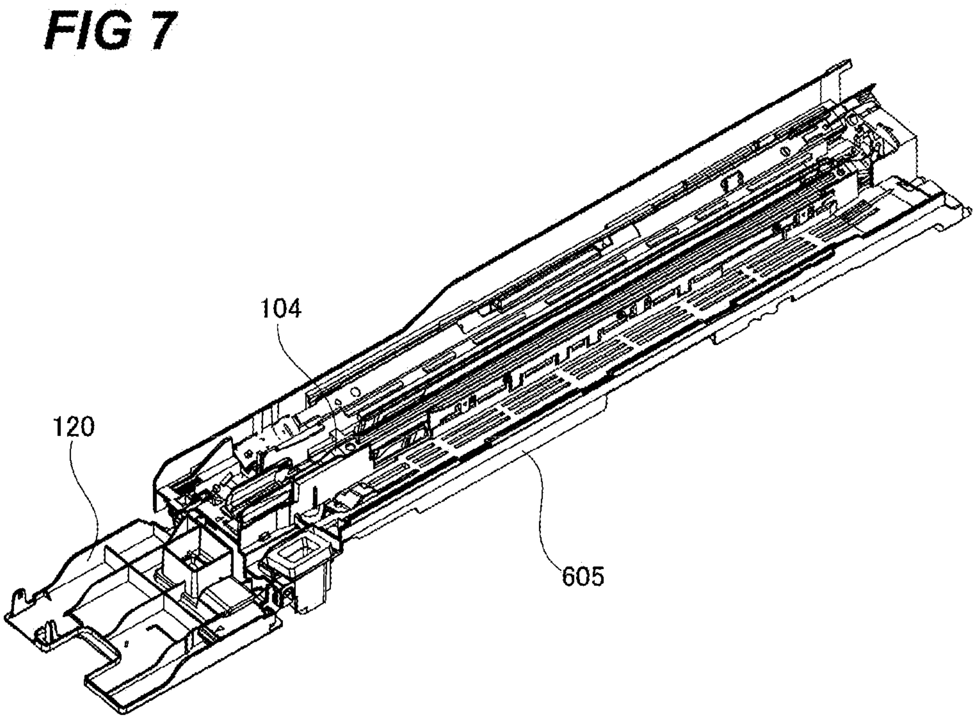
FIG. 7 is a perspective view illustrating the cartridge tray, the inner door in an opened state, and the exposure head at a retracted position.

In addition, the image forming apparatus 100 includes a cartridge tray 605 (605Y, 605M, 605C, and 605K) for each image forming portion (see FIGS. 6 and 7). The drum unit 601 and the developing unit 600 are supported by the cartridge tray 605 of each image forming portion, guided in an axial direction of the photosensitive drum, and inserted into and removed from the apparatus body of the image forming apparatus 100.

Figure 3A:
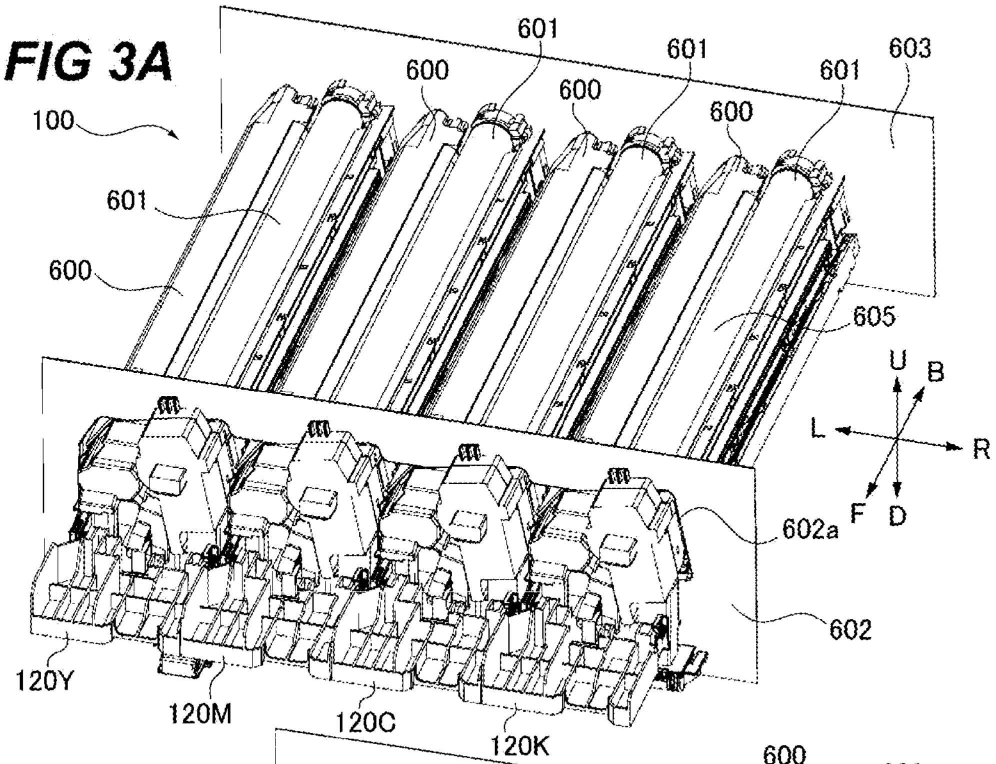
FIGS. 3A and 3B are perspective views illustrating a configuration of the periphery of a drum unit and a developing unit.
Figure 3B:
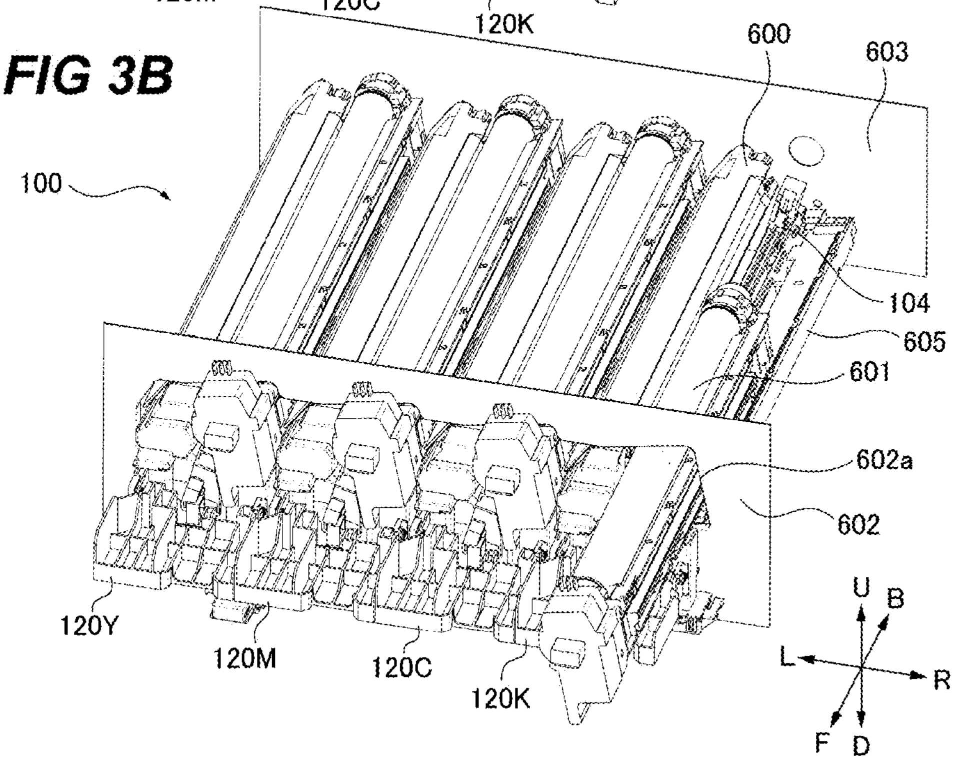

As illustrated in FIGS. 3A and 3B, one side of the cartridge tray 605 is attached to a front plate 602 and the other side of the cartridge tray 605 is attached to a back plate 603 in the axial direction of the photosensitive drum. The front plate 602 is formed of a sheet metal, and forms a part of a housing (frame body) of the apparatus body on a front side of the apparatus body of the image forming apparatus 100. The back plate 603 is formed of a sheet metal, and forms a part of the housing (frame body) of the apparatus body on a back side of the apparatus body of the image forming apparatus 100. The front plate 602 and the back plate 603 are arranged to face each other on one side and the other side in the axial direction of the photosensitive drum, and a sheet metal (not illustrated) as a beam is bridged therebetween. Each of the front plate 602, the back plate 603, and the beam (not illustrated) forms a part of the frame body of the image forming apparatus 100. Here, the front side of the image forming apparatus of the present embodiment or a constituent member of the image forming apparatus is a side on which the drum unit 601 and the developing unit 600 are taken in and out (inserted and removed) with respect to the apparatus body of the image forming apparatus 100.

An opening 602*a* is formed in the front plate 602 in such a way that the drum unit 601 and the developing unit 600 can be inserted and removed on the front side of the image forming apparatus 100. The drum unit 601 and the developing unit 600 are mounted at a predetermined position (mounting position) in the apparatus body of the image forming apparatus 100 via the opening 602*a*.

The image forming apparatus 100 includes inner doors 120Y, 120M, 120C, and 120K (hereinafter, also collectively and simply referred to as "inner door 120") that cover the front sides of both the drum unit 601 and the developing unit 600 mounted at the mounting position. The inner door 120 is pivotally supported on the front side of the cartridge tray 605 and is rotatable within a predetermined range with respect to the cartridge tray 605. That is, the inner door 120 is provided so as to be openable and closable with respect to the image forming apparatus.

Furthermore, a front cover 604 forming an exterior of the apparatus is provided on the front side of the image forming apparatus 100. One end of the front cover 604 is fixed to the front side of the apparatus body of the image forming apparatus 100 by a hinge, and is rotatable with respect to the apparatus body of the image forming apparatus 100 by the hinge. The front cover 604 is provided on the front side of the inner door 120 in the axial direction of the photosensitive drum. In a closed state illustrated in FIG. 2, the front cover 604 covers all the plurality of inner doors 120 arranged in a left-right direction to form the exterior on the front side of the apparatus.

Therefore, replacement work for the drum unit 601 and the developing unit 600 is performed by the operator in the following procedure. The operator opens the front cover 604, then opens the inner door 120 as illustrated in FIGS. 3A and 3B, and takes out the drum unit 601 or the developing unit 600 in the apparatus body. Then, the replacement work is completed by inserting the new drum unit 601 or developing unit 600, closing the inner door 120, and further closing the front cover 604.

Although not illustrated, the image forming apparatus 100 according to the present embodiment includes a movement mechanism that moves the exposure head 104 (exposure unit 500) to an exposure position or a retracted position (separation position) with respect to the photosensitive drum 102. The movement mechanism is provided in the image forming apparatus 100, and moves the exposure head 104 to the exposure position or the retracted position retracted from the exposure position.

In the present embodiment, as illustrated in FIG. 6, the movement mechanism moves the exposure head 104 (exposure unit 500) in a direction away from the photosensitive drum 102 and retracts the exposure head 104 to the retracted position in conjunction with an operation of opening the inner door 120. On the other hand, as illustrated in FIG. 7, the movement mechanism moves the exposure head 104 in a direction approaching the photosensitive drum 102 and moves the exposure head 104 to the exposure position in conjunction with an operation of closing the inner door 120.

In the present embodiment, the movement mechanism moves not only the exposure head 104 (exposure unit 500) but also the developing unit 600 to a developing position or a retracted position retracted from the developing position. That is, the movement mechanism moves the developing unit 600 in a direction away from the photosensitive drum 102 and retracts the developing unit 600 to the retracted position in conjunction with the operation of opening the inner door 120. On the other hand, the movement mechanism moves the developing unit 600 in a direction approaching the photosensitive drum 102 and moves the developing unit 600 to the developing position in conjunction with the operation of closing the inner door 120.

The movement mechanism (a liftable duct 609, rotating arms 610, a link member (not illustrated)) will be described below.

In the following description, a front plate 602 side is defined as the front side of the apparatus body, and a back plate 603 side is defined as the back side (or rear side) of the apparatus body. When the photosensitive drum 102K on which the electrostatic latent image related to the black toner image is formed is used as a reference, a side on which the photosensitive drum 102Y on which the electrostatic latent image related to the yellow toner image is formed is disposed is defined as a left side. When the photosensitive drum 102Y on which the electrostatic latent image related to the yellow toner image is formed is used as a reference, a side on which the photosensitive drum 102K on which the electrostatic latent image related to the black toner image is formed is disposed is defined as a right side. Furthermore, an upward direction in a vertical direction that is perpendicular to a front-back direction and the left-right direction defined here is defined as an upward direction, and a downward direction in the vertical direction that is perpendicular to the front-back direction and the left-right direction defined here is defined as a downward direction. A front direction F, a rear direction B, a left direction L, a right direction R, an upward direction U, and a downward direction D that are defined are illustrated in FIGS. 2, 3A, and 3B.

In addition, a rotational axis direction of the photosensitive drum 102 in the following description is a direction coinciding with the front-back direction illustrated in FIGS. 3A and 3B. A longitudinal direction of the exposure head 104 also coincides with the front-back direction illustrated in FIGS. 3A and 3B. That is, the rotational axis direction of the photosensitive drum 102 coincides with the longitudinal direction of the exposure head 104. In addition, one end side of the photosensitive drum 102 in the rotational axis direction means the front side defined herein, and the other end side of the photosensitive drum 102 in the rotational axis direction means the back side defined herein. One end side and the other end side in the front-back direction also correspond to the front side and the back side defined here. One end side in the left-right direction means the left side defined here, and the other end side in the left-right direction means the right side defined here. In addition, the longitudinal direction of the exposure head 104 in the following description means the front-back direction defined here, and a lateral direction of the exposure head 104 means the left-right direction defined here.

(Exposure Unit)

Next, the exposure unit 500 including the exposure head 104 will be described. The exposure unit 500 illustrated in FIG. 1 includes the exposure head 104 (see FIG. 5) that exposes the photosensitive drum 102.

(Configuration of Exposure Head)

Next, the exposure head (optical print head) 104 included in the exposure unit 500 will be described. Examples of an exposure system adopted in an electrophotographic system image forming apparatus include a laser beam scanning exposure system in which an irradiation beam of a semiconductor laser is scanned with a rotating polygon mirror or the like, and a photosensitive drum is exposed through a f-θ lens or the like. The "exposure head 104" described in the present embodiment is used for an LED exposure system that exposes the photosensitive drum 102 by using light emitting elements such as LEDs arranged in the rotational axis direction of the photosensitive drum 102, and is not used for the laser beam scanning exposure system described above.

Figure 5:
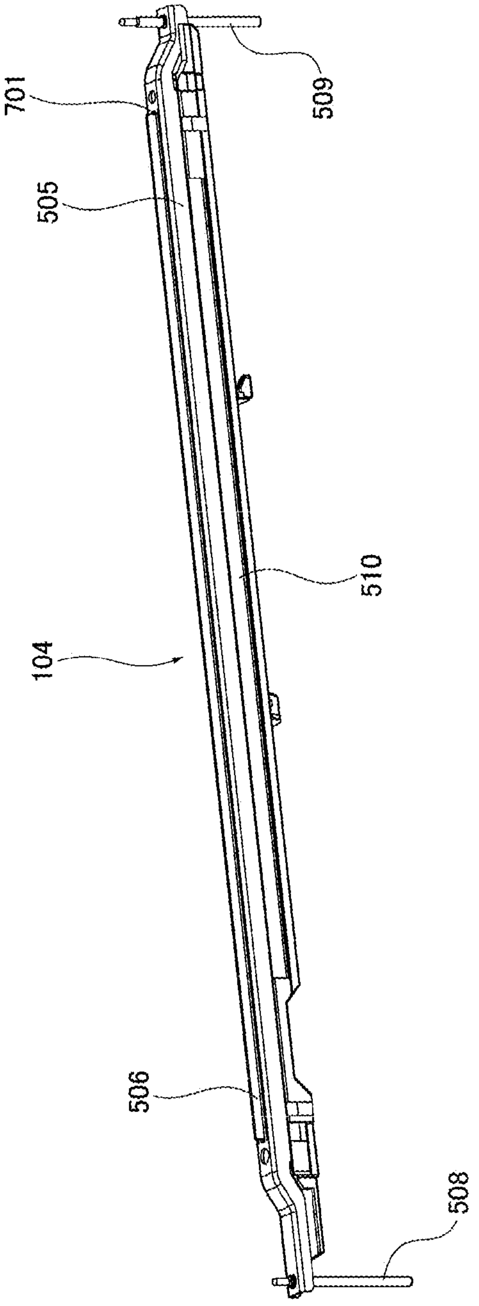
FIG. 5 is a perspective view of the exposure head.

The exposure head 104 described in the present embodiment is provided below a rotational axis of the photosensitive drum 102 in the vertical direction, and LEDs 503 of the exposure head 104 expose the photosensitive drum 102 from below. FIG. 5 is a schematic perspective view of the exposure head 104 included in the image forming apparatus 100 of the present embodiment.

The exposure head 104 has an elongated shape (longitudinal shape) extending in the rotational axis direction of the photosensitive drum 102. Furthermore, the exposure head 104 includes a housing 505, a substrate 502 (see FIG. 4A), a lens array 506, and a housing support member 510 (see FIG. 5).

(Housing)

The housing 505 holds the substrate 502 and the lens array 506. The housing 505 has an opening 701 serving as a lens attachment portion for attaching the lens array 506. The housing 505 is made of metal. For example, the housing 505 is formed by pressing a sheet metal such as a thin iron plate into a U shape.

The housing 505 of the exposure head 104 is provided with a positioning pin 508 serving as a first fixing member and a positioning pin 509 serving as a second fixing member. Each of the positioning pin 508 and the positioning pin 509 is an example of a metal pin. The positioning pin 508 and the positioning pin 509 are fixed to both end portions of the housing 505 in a longitudinal direction. The positioning pin 508 is fixed to the housing 505 on one side (front side) of the lens array 506 in the axial direction of the photosensitive drum 102, and protrudes from both sides of the housing 505 in the optical axis direction of the lens array 506. The positioning pin 509 is fixed to the housing 505 on the other side (back side) of the lens array 506 in the axial direction of the photosensitive drum 102, and protrudes from both sides of the housing 505 in the optical axis direction of the lens array 506.

In order to keep a distance between the surface of the photosensitive drum 102 and a light emitting surface of the lens array 506 of the exposure head 104 with high accuracy, the positioning pins 508 and 509 are fastened to the housing 505 by adjusting a position of a positioning surface at a distal end of a shaft with reference to the housing 505. The fixing of the positioning pins 508 and 509 to the housing 505 is not limited thereto, and for example, the positioning pin

508 and the positioning pin 509 made of metal may be fixed to the housing 505 made of metal by welding. As described above, in the present embodiment, the positioning pin 508 and the positioning pin 509 are integrated with the housing 505.

Then, when the exposure head 104 is moved to the exposure position, the positioning pins 508 and 509 of the exposure head 104 respectively abut on predetermined portions of the drum unit 601 that supports the photosensitive drum 102. Thus, the distance between the exposure head 104 and the surface of the photosensitive drum 102 is kept constant at the exposure position.

(Substrate)

Figure 4A:
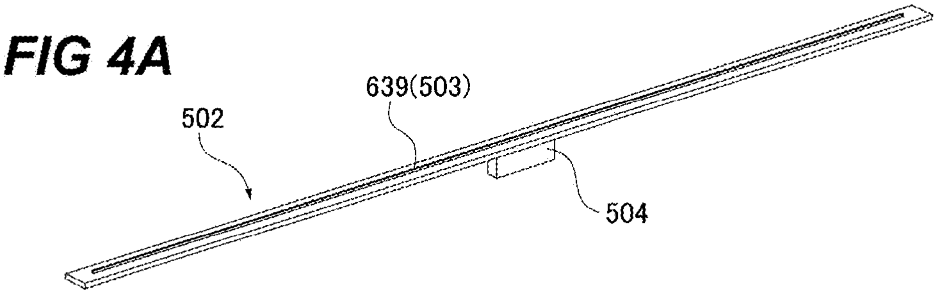
FIGS. 4A, 4B, and 4C are views illustrating a substrate in an exposure head.
Figure 4B:
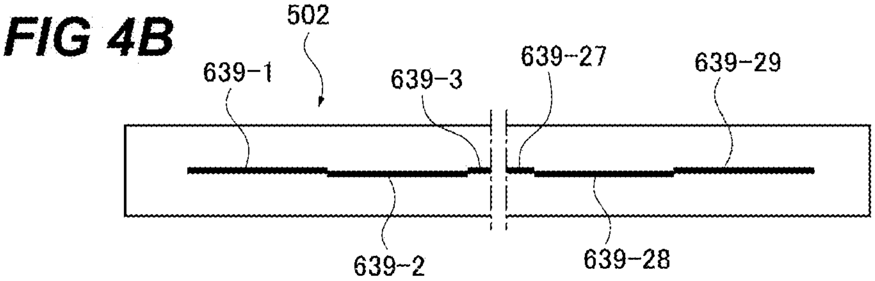
Figure 4C:
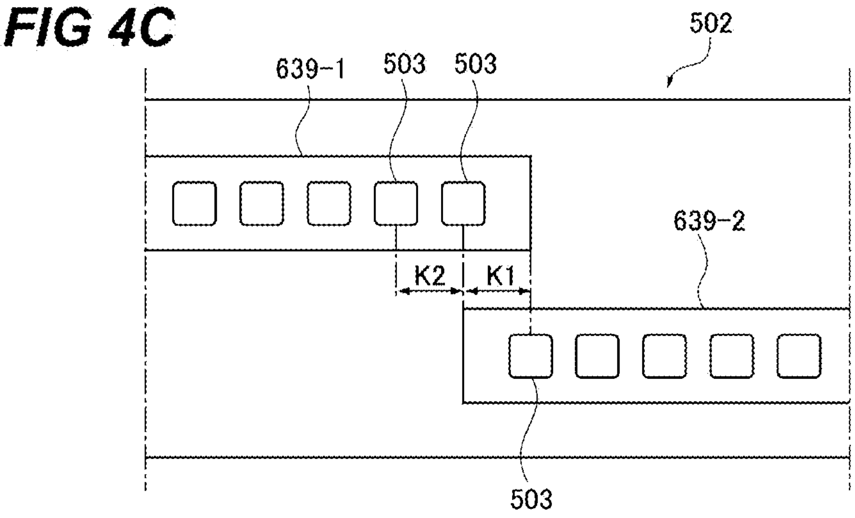

Next, the substrate 502 will be described. FIG. 4A is a schematic perspective view of the substrate 502 in the exposure head 104. FIG. 4B is a view illustrating an arrangement of the plurality of LEDs 503 provided on the substrate 502, and FIG. 4C is an enlarged view of FIG. 4B.

An LED chip 639 is mounted on the substrate 502. As illustrated in FIG. 4A, the LED chip 639 is provided on one surface of the substrate 502, and a long flat flexible cable (FFC) connector 504 is provided on the other surface (a surface opposite to a side on which the light emitting elements are arranged) of the substrate 502. The FFC connector 504 is attached to a lower surface of the substrate 502 in such a way that a longitudinal direction thereof is along the longitudinal direction of the substrate 502. A wiring for supplying a signal to each LED chip 639 is provided on the substrate 502. One end of a flexible flat cable (not illustrated, hereinafter abbreviated as FFC) as an example of a cable is connected to the FFC connector 504.

The image forming apparatus 100 is provided with a control board (not illustrated) including a controller and a connector. The other end of the FFC is connected to the connector. That is, the FFC electrically connects the control board including the controller and the substrate 502. A control signal (drive signal) is input from the controller of the image forming apparatus 100 to the substrate 502 via the FFC and the FFC connector 504. The LED chip 639 is driven by the control signal input to the substrate 502.

The LED chip 639 mounted on the substrate 502 will be described in more detail. As illustrated in FIGS. 4B and 4C, a plurality of LED chips 639-1 to 639-29 (29 LED chips) in which the plurality of LEDs 503 (an example of light emitting elements) is arranged is arranged on one surface of the substrate 502. In each of the LED chips 639-1 to 639-29, 516 LEDs 503 are arranged in a row in a longitudinal direction thereof. In the longitudinal direction of the LED chip 639, a center-to-center distance k2 between adjacent LEDs 503 corresponds to a resolution of the image forming apparatus 100. Since the resolution of the image forming apparatus 100 of the present embodiment is 1200 dpi, the LEDs 503 are arranged in a row in such a way that the center-to-center distance between adjacent LEDs 503 is 21.16 μm in the longitudinal direction of the LED chips 639-1 to 639-29. Therefore, an exposure range of the exposure head 104 of the present embodiment is about 314 mm. A photosensitive layer of the photosensitive drum 102 is formed to have a width of 314 mm or more. Since a length of a long side of an A4-size recording sheet and a length of a short side of an A3-size recording sheet are 297 mm, the exposure head 104 of the present embodiment has an exposure range in which an image can be formed on the A4-size recording sheet and the A3-size recording sheet.

The LED chips 639-1 to 639-29 are alternately arranged in two rows in the rotational axis direction of the photosensitive drum 102. That is, as illustrated in FIG. 4B, odd-numbered LED chips 639-1, 639-3, . . . , and 639-29 counted from the left side are mounted in a row in the longitudinal direction of the substrate 502. Further, even-numbered LED chips 639-2, 639-4, . . . , and 639-28 counted from the left side are mounted in a row in the longitudinal direction of the substrate 502. By arranging the LED chips 639 in this way, among different adjacent LED chips 639, a center-to-center distance k1 between the LED 503 disposed at one end of one LED chip 639 in the longitudinal direction of the LED chip 639 and the LED 503 disposed at the other end of the other LED chip 639 in the longitudinal direction of the LED chip 639 can be made equal to the center-to-center distance k2 between adjacent LEDs 503 in one LED chip 639 as illustrated in FIG. 4C.

In the present embodiment, a configuration using an LED as the light emitting element is exemplified, but for example, a configuration using an organic light emitting diode (OLED) may be used. The OLED is also called organic electro-luminescence (EL), and is a current-driven light emitting element. The OLEDs are arranged on a line in a main scanning direction (the rotational axis direction of the photosensitive drum 102) on a thin film transistor (TFT) substrate, for example, and are electrically connected in parallel by a power supply wiring similarly provided in the main scanning direction.

(Lens Array)

Figure 4D:
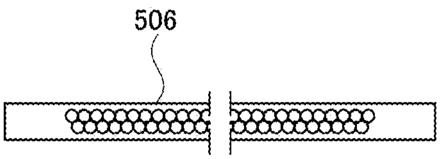
FIGS. 4D and 4E are views illustrating a lens array.
Figure 4E:
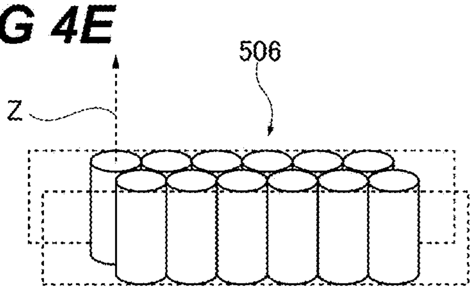

Next, the lens array 506 will be described. FIG. 4D is a schematic view of the lens array 506 when viewed from a photosensitive drum 102 side. FIG. 4E is a schematic perspective view of the lens array 506. As illustrated in FIG. 4D, in the lens array 506, a plurality of lenses is arranged in two rows in an arrangement direction of the plurality of LEDs 503. One lens in one row is in contact with two lenses in the other row that are adjacent to each other in an arrangement direction of the lenses, and such an arrangement of the lenses is alternately repeated. Each lens is a cylindrical rod lens made of glass. A material of the lens is not limited to glass, and may be plastic. A shape of the lens is not limited to the cylindrical shape, and may be, for example, a polygonal prism such as a hexagonal prism.

A dotted line Z illustrated in FIG. 4E indicates an optical axis of the lens. The exposure head 104 is substantially movable in a direction (upward-downward direction) along the optical axis of the lens indicated by the dotted line Z by the movement mechanism (not illustrated). The optical axis of the lens here means a line connecting the center of a light emitting surface of the lens and a focal point of the lens. Radiation light emitted from the LED 503 is incident on the lens included in the lens array 506. The lens has a function of collecting the incident radiation light on the surface of the photosensitive drum 102. An attachment position of the lens array 506 with respect to the opening 701 (see FIG. 5) that is the lens attachment portion is adjusted at the time of assembling the exposure head 104. At this time, the attachment position of the lens array 506 is adjusted in such a way that a distance between the light emitting surface of the LED 503 and a light incident surface of the lens is substantially equal to a distance between the light emitting surface of the lens and the surface of the photosensitive drum 102.

(Housing Support Member)

The housing support member 510 supports the housing 505 holding the substrate 502 and the lens array 506 in a longitudinal direction, and is fixed to the housing 505 by a fixing method described below. The housing support member 510 is a longitudinal member extending in the axial direction of the photosensitive drum 102. The housing support member 510 is formed in a U shape. The housing support member 510 has a plurality of openings 510*a* in the longitudinal direction that is the axial direction of the photosensitive drum 102.

The opening 510*a* of the housing support member 510 is provided at a position facing a surface (a back surface of the substrate 502) of the substrate 502 opposite to a mounting surface (a front surface of the substrate 502) of the substrate 502 on which the LEDs 503 are mounted.

As described above, the housing support member 510 is provided in the longitudinal direction that is the axial direction of the photosensitive drum 102, and has the opening 510*a* at a position facing the back surface of the substrate 502. As a result, the airflow sent from the duct unit 606 is blown onto the back surface of the substrate 502 through the opening 510*a* of the housing support member 510. The housing support member 510 of the exposure head 104 forms a duct (closed space) for allowing flow of the airflow blown onto the back surface of the substrate 502 through the opening 510*a* in the longitudinal direction of the substrate 502, that is, a part of a duct for cooling the exposure head 104.

As described above, the exposure head 104 is configured as an integrated head unit by the substrate 502 including the LEDs 503, the lens array 506 including the plurality of lenses, the housing 505, and the housing support member 510.

(Positioning Member of Exposure Head)

Next, positioning of the exposure head 104 in the axial direction of the photosensitive drum 102 by a positioning member 250 will be described with reference to FIGS. 8 to 10.

Figure 8:
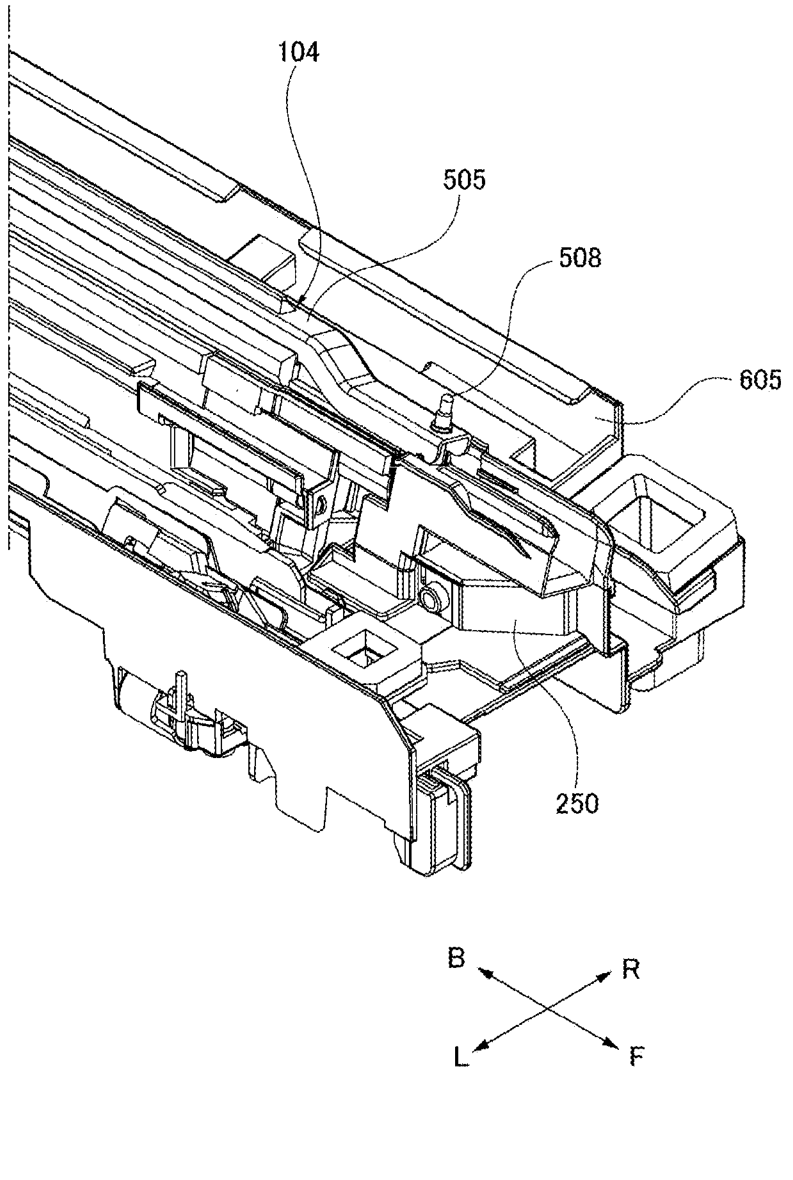
FIG. 8 is a perspective view of a positioning member after attachment.
Figure 9:
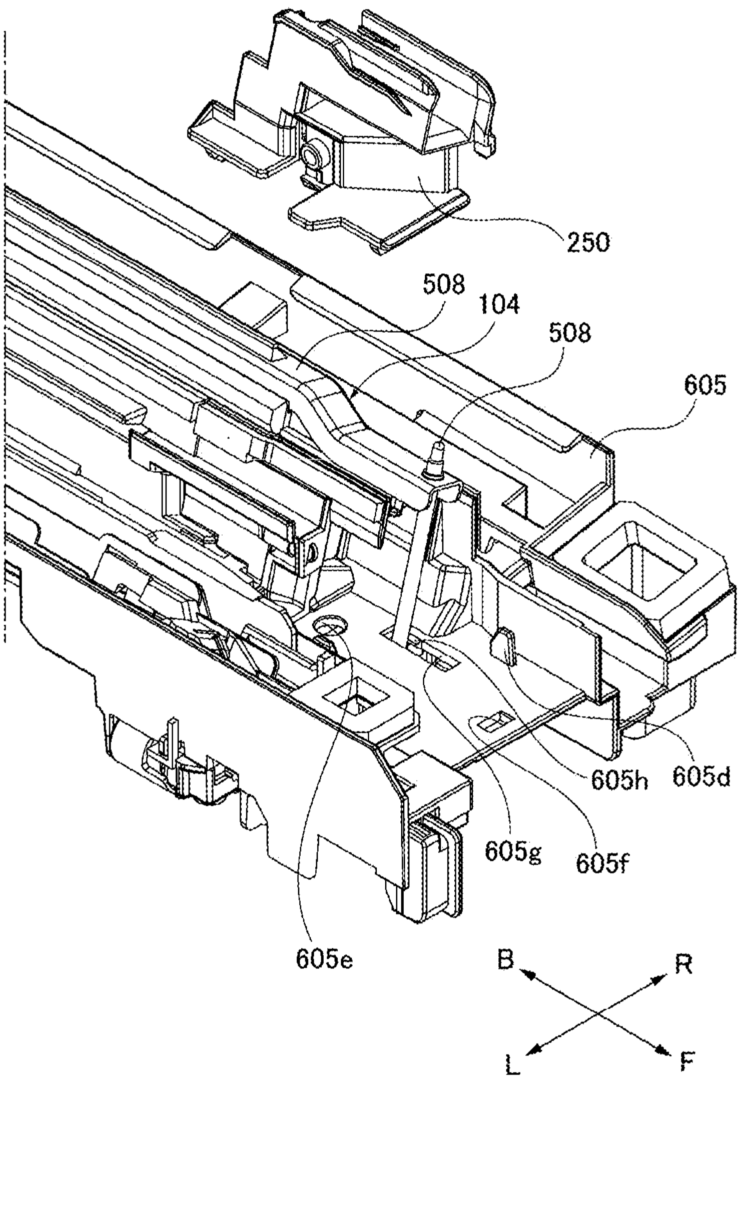
FIG. 9 is a perspective view of the positioning member before attachment.

FIG. 8 is a perspective view after the positioning member 250 is attached, and FIG. 9 is a perspective view before the positioning member 250 is attached. FIG. 10 is a perspective view illustrating a shape of the positioning member 250.

As illustrated in FIG. 8, the positioning member 250 for positioning the exposure head 104 with respect to the image forming apparatus 100 is attached to the front side of the exposure head 104. As illustrated in FIG. 9, an urging portion 605*d*, a round hole portion 605*e*, a rectangular hole portion 605*f*, and a projection engagement portion 605*g* are provided on the front side of the cartridge tray 605.

Figure 10:
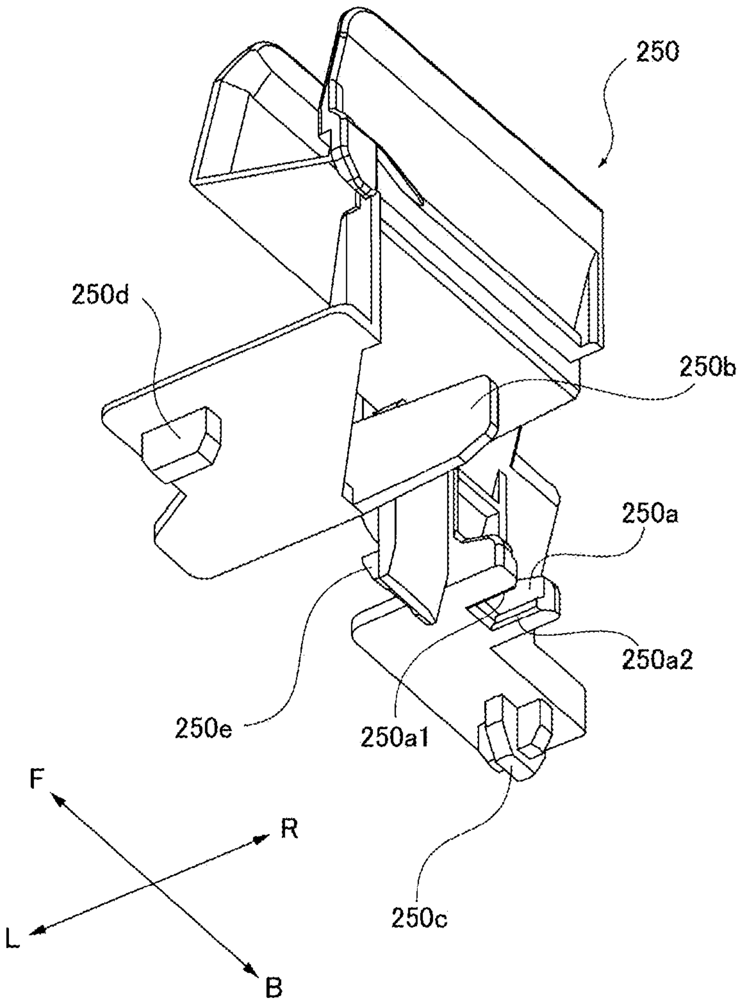
FIG. 10 is a perspective view illustrating a shape of the positioning member.

As illustrated in FIG. 10, a lower surface of the positioning member 250 is provided with a regulating portion 250*a*, an urging portion 250*b*, a cross protrusion portion 250*c*, an I-shaped protrusion portion 250*d*, and a projection portion 250*e*.

An outer diameter of the cross protrusion portion 250*c* is substantially equal to an inner diameter of the round hole portion 605*e*, and a length of the I-shaped protrusion portion 250*d* in the left-right direction is substantially equal to a length of the rectangular hole portion 605*f* in the left-right direction. Positions of the positioning member 250 in the front-back direction and the left-right direction are determined by fitting the protrusion portions 250*c* and 250*d* and the hole portions 605*e* and 605*f*.

The projection portion 250*e* has a bent shape, and the bent shape is caught by the projection engagement portion 605*g*, whereby a position of the positioning member 250 in the upward-downward direction is determined.

The regulating portion 250*a* has a first abutting surface 250*al* abutting on one side of the positioning pin 508 in the axial direction and a second abutting surface 250*a*2 abutting on the other side of the positioning pin 508 in the axial direction. The first abutting surface 250*al* and the second abutting surface 250*a*2 face each other in the axial direction. The regulating portion 250*a* has a recessed shape opened on a right side in the left-right direction, and a notch width of the recessed shape in the front-back direction and an outer diameter of the positioning pin 508 are substantially equal to each other. When the regulating portion 250*a* and the positioning pin 508 are fitted, the exposure head 104 is positioned with respect to the positioning member 250 in the axial direction of the photosensitive drum 102.

In this manner, the position of the exposure head 104 in the axial direction of the photosensitive drum 102 can be accurately determined by the positioning member 250 attached after the exposure head 104 is mounted.

In the present embodiment, backlash is reduced by the urging portion 250*b* and the urging portion 605*d*. The urging portion 250*b* extends rightward in the left-right direction from the positioning member 250, has a small thickness in the axial direction of the photosensitive drum 102, and has a shape that is easily elastically deformed in the axial direction of the photosensitive drum 102. Meanwhile, the urging portion 605*d* has a shape protruding from an upper surface of the cartridge tray 605, and is formed in a shape having rigidity sufficient to prevent deformation in the axial direction of the photosensitive drum 102. Further, the urging portion 605*d* is dimensioned to allow interference (contact) with a distal end of the urging portion 250*b* when the positioning member 250 is mounted on the cartridge tray 605. A front surface of the distal end of the urging portion 250*b* and a back surface of the urging portion 605*d* come into contact with each other, and the urging portion 250*b* is elastically deformed in a back surface direction, so that the positioning member 250 is urged in the back surface direction, that is, from one side to the other side in the axial direction of the photosensitive drum 102 by a reaction force thereof.

By adopting a configuration in which the positioning member 250 is urged in the axial direction of the photosensitive drum 102, it is possible to implement highly accurate positioning of the exposure head 104 which is hardly affected by repeated operations of attaching and detaching the exposure head 104, and to implement more precise positioning.

(Movement Mechanism)

The movement mechanism of the exposure head 104 includes the liftable duct 609, the rotating arms 610, and the link member (not illustrated). In the present embodiment, the movement mechanism has a function of moving not only the exposure head 104 (exposure unit 500) but also the developing unit 600 to the developing position or the retracted position retracted from the developing position. The configuration of the movement mechanism is an example and is not limited thereto.

Figure 13:
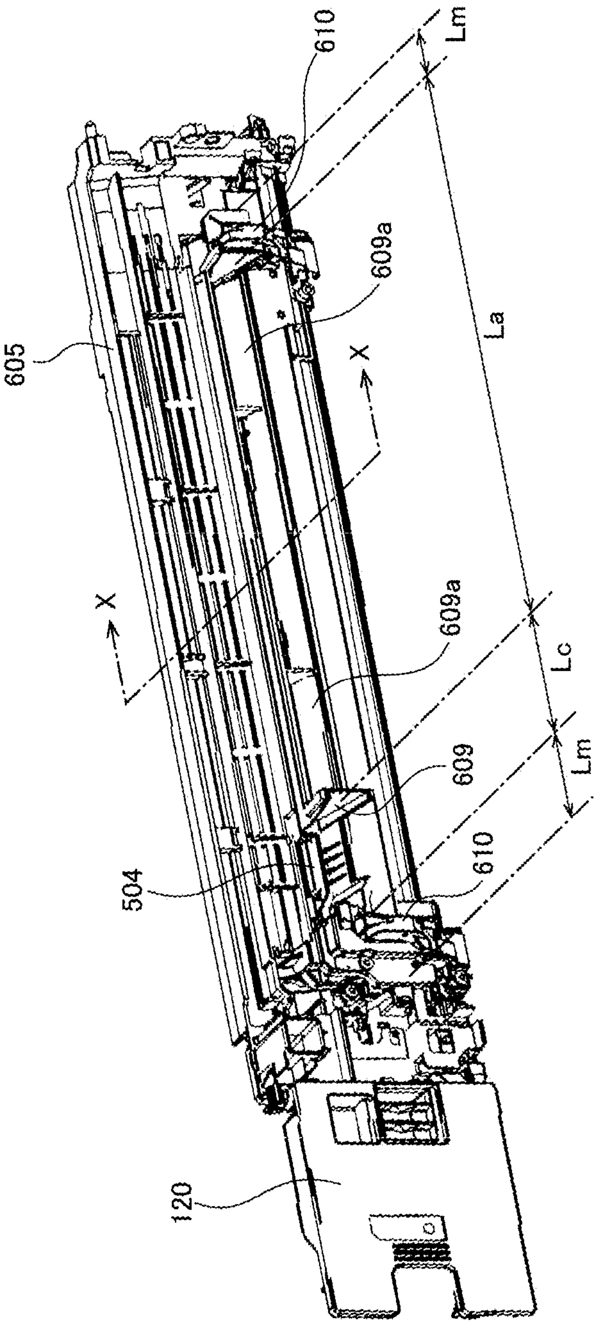
FIG. 13 is a perspective view of the cartridge tray and a liftable duct when viewed from below.
Figure 14:
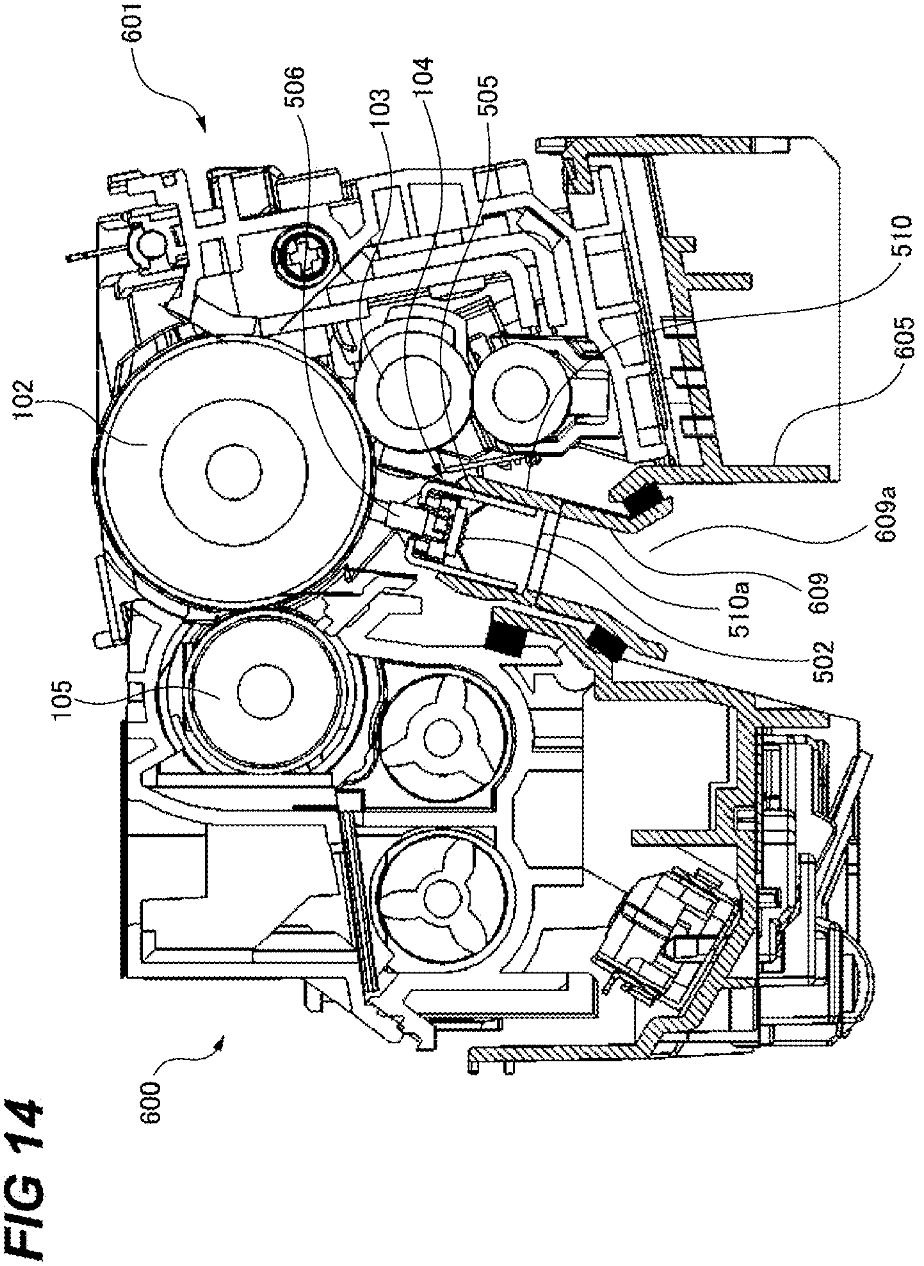
FIG. 14 is a cross-sectional view illustrating a cooling configuration of the exposure head.

The movement mechanism including the liftable duct 609 and the rotating arms 610 will be described with reference to FIGS. 13 and 14. FIG. 13 is a perspective view of the cartridge tray when viewed from below. FIG. 14 is a cross-sectional view of the exposure head taken along line X-X in FIG. 13 when viewed from the front.

The liftable duct 609 is an exposure support member that detachably supports the exposure head 104, and is provided in the apparatus body of the image forming apparatus 100 together with the cartridge tray 605.

The liftable duct 609 is provided at a tray center portion corresponding to a portion between a developing support portion of the cartridge tray 605 that supports the developing unit 600 and a drum support portion that supports the drum unit 601. The liftable duct 609 is provided at the tray center portion of the cartridge tray 605 so as to be movable to the exposure position where the photosensitive drum 102 is exposed and the retracted position retracted from the exposure position. Both end portions of the liftable duct 609 in a longitudinal direction are supported from below by the rotating arms 610. The liftable duct 609 is moved by the rotating arms 610 in a direction (movement direction) orthogonal to the axial direction of the photosensitive drum 102 integrally with the exposure head 104. The liftable duct 609 is moved to the exposure position or the retracted position by the rotation of the rotating arms 610.

The liftable duct 609 has a longitudinal shape extending in the front-back direction (the axial direction of the photosensitive drum) similarly to the exposure head 104 so as to be able to support the entire exposure head 104, and a central portion thereof has upper and lower openings. The liftable duct 609 forms a duct in which one opening (not illustrated) communicates with the opening 510*a* of the exposure head 104 and the other opening 609*a* (see FIG. 13) communicates with an opening 606*a* (see FIG. 12) of the duct unit 606. The liftable duct 609 supports the exposure head 104 and forms a part of a duct (closed space) that allows the exposure head 104 and the duct unit 606 to communicate with each other to form a flow path of an airflow for cooling the exposure head 104.

The liftable duct 609 is formed in a hollow shape having no opening at a position facing the developing unit 600 and the drum unit 601 and having upper and lower openings. The liftable duct 609 forms an exposure duct that allows the exposure head 104 and the duct unit 606 to communicate with each other to form a space through which air for cooling the exposure head 104 flows.

Therefore, the liftable duct 609 causes the airflow generated by the duct unit 606 to flow to the back surface of the substrate 502 of the exposure head 104 through the above-described upper and lower openings. Therefore, the liftable duct 609 can allow flow of the airflow generated by the duct unit 606 to the back surface of the substrate 502 of the exposure head 104 without leaking the airflow to the developing unit 600 and the drum unit 601 adjacent thereto, and can thus reduce scattering of the toner inside the apparatus.

Further, the rotating arms 610 that move the exposure head 104 to the exposure position close to the photosensitive drum 102 and the retracted position retracted from the exposure position is disposed at both end portions of the liftable duct 609 in the longitudinal direction. The rotating arms 610 are rotatably provided on a developing unit side of the cartridge tray 605. One end portion of the rotating arm 610 in the left-right direction orthogonal to the axial direction of the photosensitive drum 102 is supported so as to be rotatable around an axis parallel to the axial direction. The other end portion of the rotating arm 610 in the left-right direction supports both end portions of a region (a range Lm in FIG. 13) outside the opening of the liftable duct 609 in the axial direction. The rotating arm 610 is configured to operate in conjunction with opening and closing of the inner door 120 by the link member (not illustrated).

In the liftable duct 609 illustrated in FIG. 13, a range of the opening forming the duct is denoted by La, and the range of the arrangement of the rotating arm 610 is denoted by Lm. The range La of the opening of the liftable duct 609 is provided between the ranges Lm of the arrangement of the rotating arms 610.

A range Lc in FIG. 13 is a region where the FFC connector 504 of the exposure head 104 is provided, and is provided outside the duct region indicated by the range La in FIG. 13 and between the duct region and the region indicated by one of the ranges Lm in FIG. 13.

In addition, the range La of the duct includes most of the substrate 502 on which the LEDs 503 are mounted, and the exposure head 104 can be sufficiently cooled by blowing the airflow to the range La. The range Lc is a mounting portion of the FFC connector 504 of a signal line that transmits a drive signal to the substrate 502 on which the LEDs 503 are mounted. The range Lc is not provided with an opening for forming the duct, but necessary and sufficient cooling can be made in the range La as described above.

As a result, air taken in from the outside of the apparatus by the duct unit 606 is blown onto the back surface of the substrate 502 from the opening 510*a* of the exposure head 104 through the liftable duct 609. The airflow blown from the opening 510*a* of the exposure head 104 onto the back surface of the substrate 502 is exhausted to the outside of the apparatus by the duct unit 606 through the liftable duct 609.

(Duct Unit)

Figure 11:
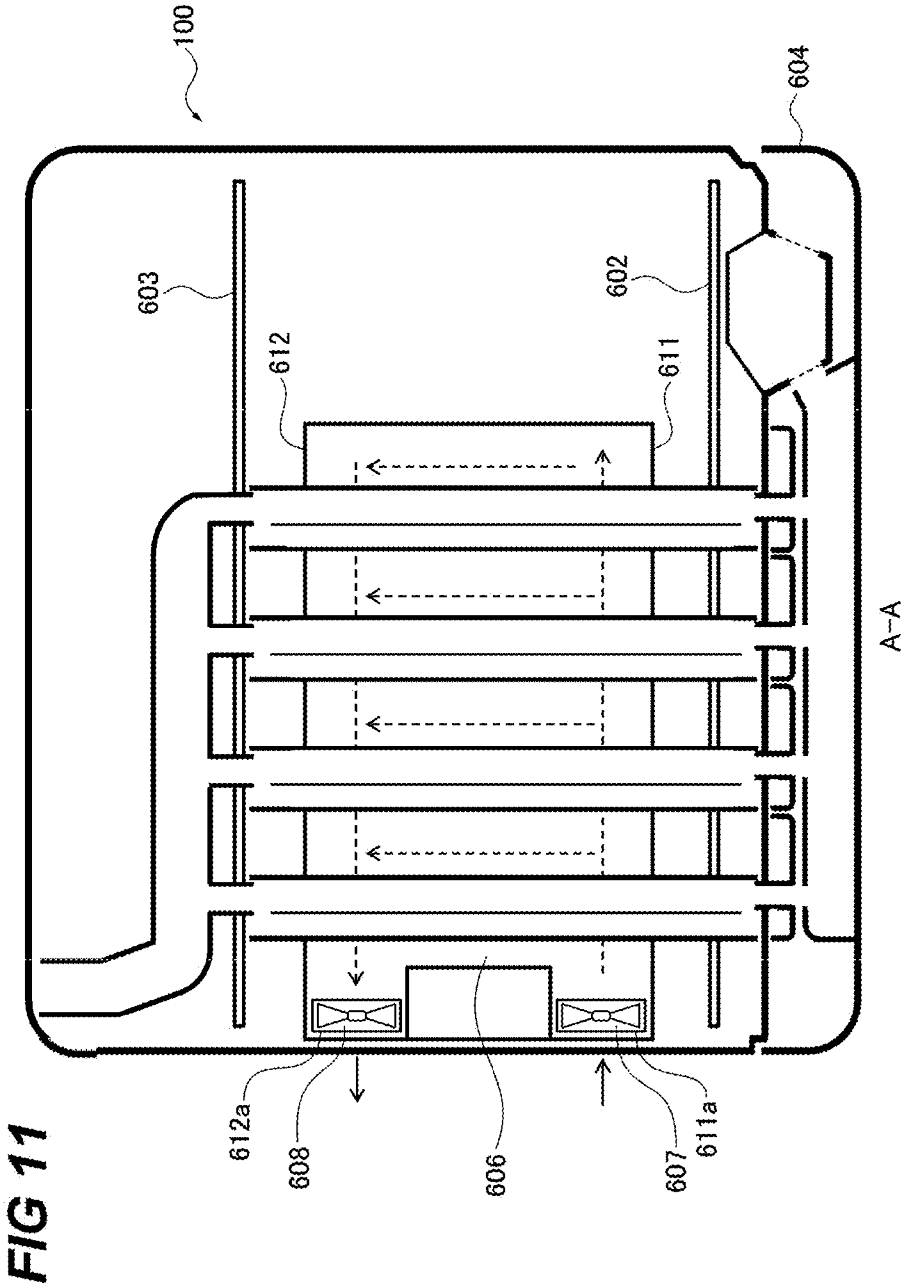
FIG. 11 is a cross-sectional view illustrating a cooling configuration of the exposure head.
Figure 12:
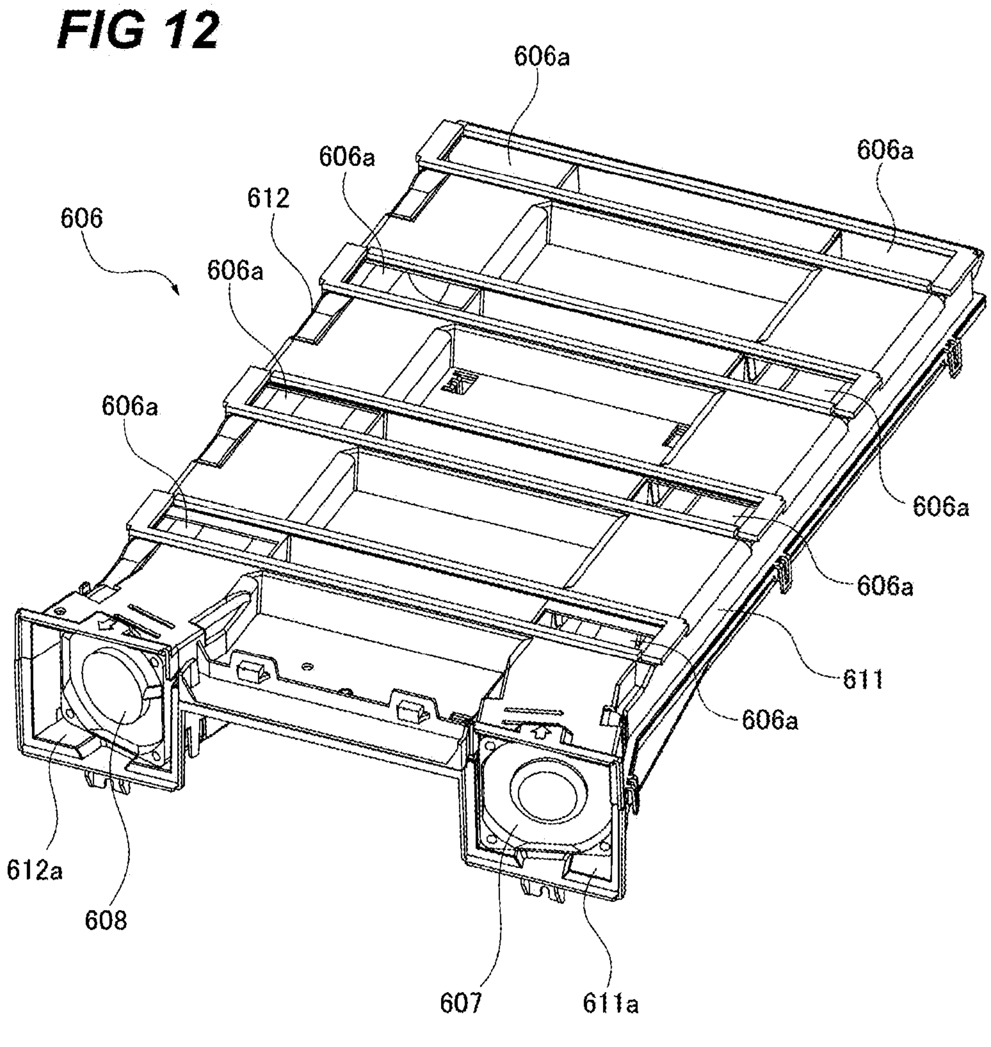
FIG. 12 is a perspective view of a duct unit.

The image forming apparatus 100 also includes the duct unit 606 that is detachable. The duct unit 606 will be described with reference to FIGS. 11 and 12. FIG. 11 is a cross-sectional view of the image forming apparatus taken along line A-A in FIG. 1. FIG. 12 is a perspective view of the duct unit when viewed from above.

The duct unit 606 is an exposure cooling unit that communicates with the opening 609*a* formed by the cartridge tray 605 and the liftable duct 609 and cools the exposure head 104 with the airflow through the liftable duct 609.

The duct unit 606 includes an exhaust duct 612 that communicates with the liftable duct 609 and forms a space through which air introduced from the liftable duct 609 flows. The opening 606*a* that communicates with the liftable duct 609 and introduces the air from the liftable duct 609 is provided in an upper surface of the exhaust duct 612 for each exposure head. The exhaust duct 612 is provided with a fan 608 that generates an airflow.

The duct unit 606 includes an intake duct 611 that communicates with the liftable duct 609 and forms a space through which the air introduced into the liftable duct 609 flows. The opening 606*a* that communicates with the liftable duct 609 and introduces the air into the liftable duct 609 is provided in an upper surface of the intake duct 611 for each exposure head. The intake duct 611 is provided with a fan 607 that generates an airflow.

The duct unit 606 is integrally provided with the fans 607 and 608, the intake duct 611, and the exhaust duct 612, and is detachably mounted on the apparatus body of the image forming apparatus 100 immediately below the cartridge tray 605.

Each opening 606*a* of the duct unit 606 is provided at a position facing the opening 609*a* of the liftable duct 609 for each exposure head, and is connected to the opening 609*a* to communicate with the exposure head 104 to form a closed space.

(Cooling Configuration of Exposure Head)

Here, a cooling configuration of the exposure head will be described with reference to FIGS. 11 to 14. In FIG. 11, a flow of the air for cooling the exposure head is indicated by a broken line, and the flow of the air indicated by the broken line is also referred to as an exposure cooling airflow.

The exposure head 104 dissipates heat according to a light emission amount of the LED 503 and is disposed close to the development device using the toner vulnerable to heat, and thus, a cooling portion is required. In particular, in a case where the image forming process is repeated at a high frequency, that is, in a case where the image forming process is used in an apparatus with high productivity, or in a case where an image with high density is continuously output, a light emission time is long, and the light emission amount is also large. Therefore, the amount of heat generated from the LEDs 503 and a circuit on the substrate 502 on which the LEDs 503 are mounted also increases.

As a countermeasure therefor, for example, the housing 505 of the exposure head 104 is also used as a heat dissipation plate, and the exposure head 104 is configured to easily dissipate heat and hardly accumulate heat. However, even in such a case, it is conceivable that the cooling of the exposure head 104 is not in time, heat accumulation proceeds, and heat dissipated to the surroundings also increases. As a result, the toner around the developing unit 600 and a part of a circulating toner inside the developing unit may be fused, leading to an image defect.

Even in a case where the configuration for cooling the developing unit 600 is provided, it is easily conceivable that heat accumulation caused by light emission of the LEDs 503 occurs at a portion close to the exposure head 104. Therefore, it is desirable to provide the cooling configuration (exposure cooling airflow) of the exposure head 104 to decrease the amount of heat dissipated to the surroundings of the exposure head 104.

The image forming apparatus 100 includes the exposure head 104, the liftable duct 609, the cartridge tray 605, and the duct unit 606. The exposure head 104 is mounted on the liftable duct 609 disposed in the image forming apparatus 100, and is integrated with the liftable duct 609. When the exposure head 104 is mounted on the liftable duct 609, the opening 510*a* (see FIG. 15) of the housing support member 510 of the exposure head 104 communicates with one opening 609*a* (see FIG. 13) of the liftable duct 609. The liftable duct 609 forms the duct that allows the exposure head 104 and the duct unit 606 to communicate with each other. The duct unit 606 is mounted on the image forming apparatus 100 immediately below the cartridge tray 605. In other words, the duct unit 606 is provided on a side opposite to the photosensitive drum 102 across the exposure head 104. When the duct unit 606 is mounted on the image forming apparatus 100, the opening 606*a* (see FIG. 12) of the duct unit 606 communicates with the other opening 609*a* (see FIG. 13) of the liftable duct 609.

In this manner, the housing support member 510, the liftable duct 609, the cartridge tray 605, and the duct unit 606 of the exposure head 104 form a cooling duct that is one continuous closed space. Each exposure head 104 is cooled by the exposure cooling airflow (the broken line illustrated in FIG. 11) flowing through the one closed space formed by the housing support member 510, the liftable duct 609, the cartridge tray 605, and the duct unit 606.

As illustrated in FIGS. 11 and 12, the fan 607 disposed closer to the front side of the apparatus functions as an intake fan that takes air (fresh air) outside the apparatus into the duct unit 606. The fan 608 disposed closer to the back side of the apparatus functions as an exhaust fan that exhausts air inside the duct unit 606 to the outside of the apparatus.

In the exposure cooling airflow indicated by the broken line in FIG. 11, when the fan 607 and the fan 608 rotate, air outside the apparatus is introduced from an intake port 611*a* through a louver (not illustrated) provided in an exterior cover of the image forming apparatus. The air introduced from the intake port 611*a* is exhausted from each opening 606*a* of the intake duct 611 through the intake duct 611. The air exhausted from each opening 606*a* is blown to the exposure head 104 through the liftable duct 609. The air blown to the exposure head 104 through the liftable duct 609 flows from the front side of the apparatus to the back side of the apparatus in the axial direction of the photosensitive drum 102, and is introduced into the exhaust duct 612 from each opening 606*a* of the exhaust duct 612 through the liftable duct 609. The air introduced from each opening 606*a* into the exhaust duct 612 is exhausted from an exhaust port 612*a* of the exhaust duct 612 to the outside of the apparatus through the louver (not illustrated) provided in the exterior cover.

The fans 607 and 608 in the duct unit 606 are controlled based on a temperature detection sensor (not illustrated) disposed on the substrate 502 of each color. As a result, the fans are not always rotating, but start rotating when a temperature detected by the temperature detection sensor reaches a predetermined threshold. As described above, by minimizing the exposure cooling flow by the fans and also minimizing an air volume thereof, a possibility of toner scattering inside the apparatus is reduced also from the viewpoint of control.

(Method of Fixing Housing Support Member)

Figure 15:
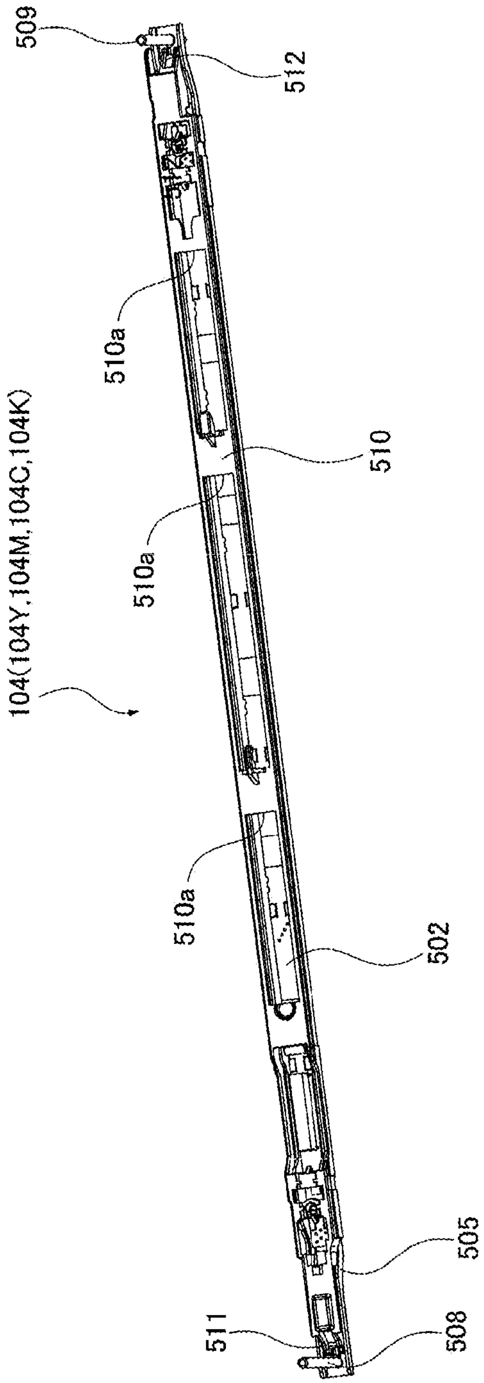
FIG. 15 is a perspective view of the exposure head according to a first embodiment when viewed from below.
Figure 16:
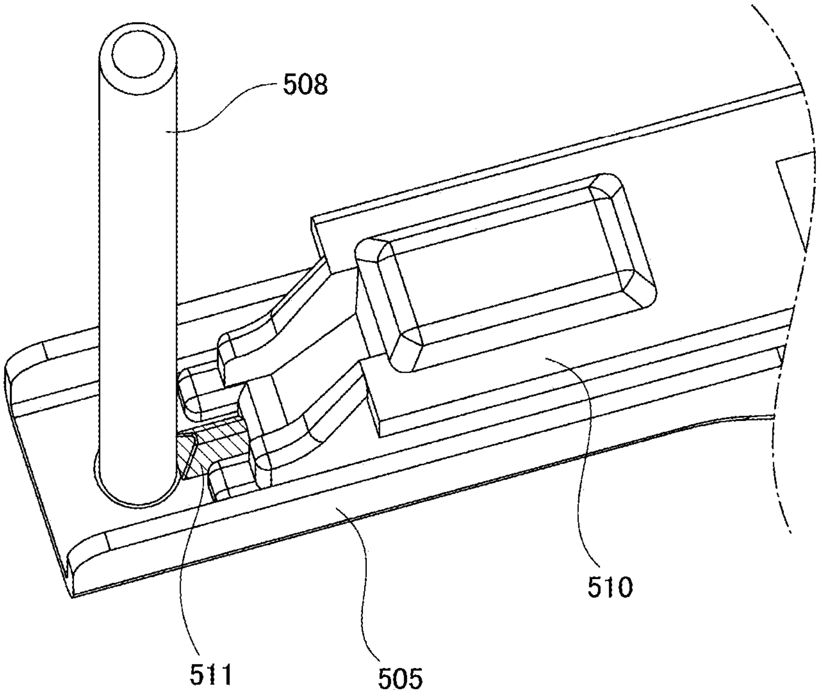
FIG. 16 is a perspective view illustrating one coupling portion between a housing and a housing support member according to the first embodiment.
Figure 17:
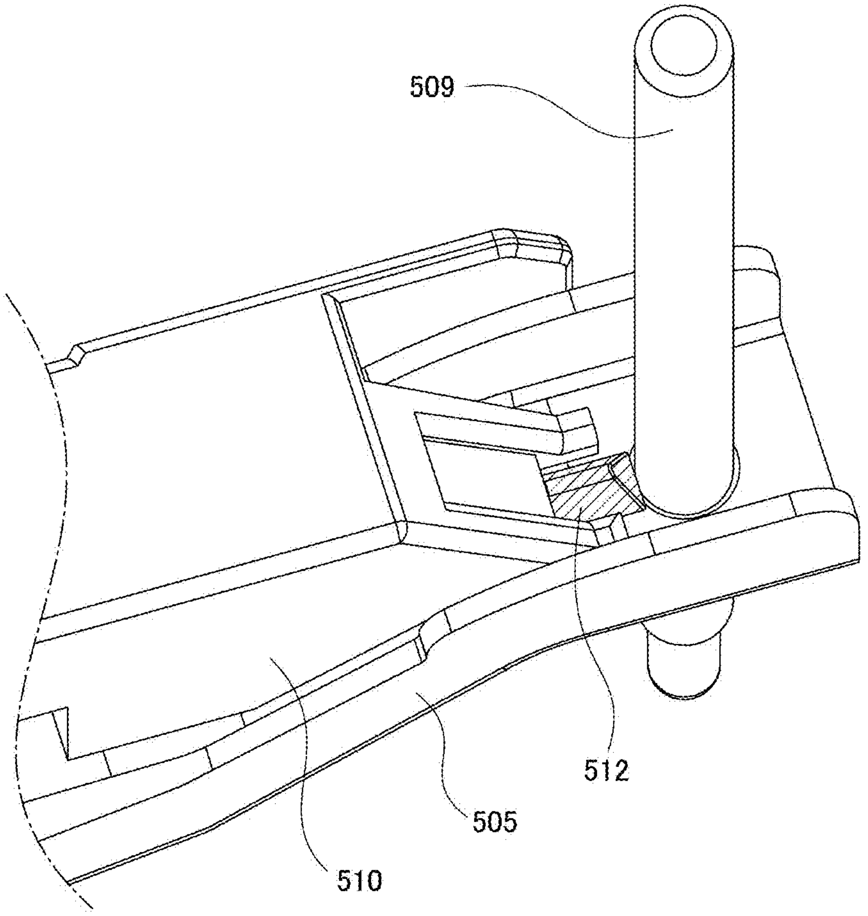
FIG. 17 is a perspective view illustrating the other coupling portion between the housing and the housing support member.

Next, a method of fixing the housing 505 and the housing support member 510 in the exposure head 104 will be described with reference to FIGS. 15 to 17. FIG. 15 is a perspective view of the exposure head according to the first embodiment when viewed from below, and illustrates a state in which the housing support member 510 is fixed to the housing 505. FIG. 16 is a perspective view illustrating one coupling portion between the housing and the housing support member according to the first embodiment. FIG. 17 is a perspective view illustrating the other coupling portion between the housing and the housing support member.

One ends of the housing 505 and the housing support member 510 in the longitudinal direction are fixed by an adhesive 511 that is an example of a first coupling member, and the other ends of the housing 505 and the housing support member 510 in the longitudinal direction are fixed by an adhesive 512 that is an example of a second coupling member.

The image forming apparatus 100 according to the present embodiment includes the plurality of photosensitive drums 102 and the plurality of exposure heads 104, and the adhesive 511 serving as the first coupling member and the adhesive 512 serving as the second coupling member are common to the plurality of exposure heads 104.

The exposure head 104 is mounted in the apparatus by engaging the housing support member 510 with the liftable duct 609, and is detached from the apparatus by disengaging the housing support member 510 from the liftable duct 609. For this reason, in the exposure head 104, the housing 505 and the housing support member 510 need to be fixed to secure a strength.

In the exposure head 104, the substrate 502 held by the housing 505 generates heat, and the temperature of the entire exposure head 104 rises. Here, the housing 505 is a metal member using metal in order to make the exposure head 104 easily dissipate heat and hardly accumulate heat by using the housing 505 itself as a heat dissipation plate. On the other hand, the housing support member 510 is a resin member molded using a resin to be utilized as an engagement portion with the liftable duct 609 and a part of a cooling mechanism. That is, linear expansion coefficients of the housing 505 and the housing support member 510 are different from each other, and a difference in thermal expansion occurs at the time of temperature rise. Specifically, the housing support member 510 made of a resin has a larger linear expansion coefficient than the housing 505 made of metal. Therefore, the housing support member 510 made of a resin is greatly deformed as compared with the housing 505 made of metal due to a thermal expansion difference at the time of temperature rise. The deformation of the housing 505 and the housing support member 510 due to the thermal expansion difference induces deformation of the substrate 502, the lens array 506, and the like, and may affect optical characteristics of the exposure head 104.

Therefore, in the present embodiment, the housing 505 and the housing support member 510 are fixed using adhesives having different hardnesses as the adhesives 511 and 512. That is, the housing 505 and the housing support member 510 are fixed to each other by using the adhesive 511 for fixing one ends in the longitudinal direction, which has hardness higher than the adhesive 512 for fixing the other ends in the longitudinal direction. Here, the hardness of the adhesive is a hardness after the adhesive is cured, and the hardness is compared after curing.

Further, the adhesives 511 and 512 fill between the housing 505 and the housing support member 510 to fix the housing 505 and the housing support member 510. For example, the adhesive is applied so as to fill between a flat surface of the housing 505 and a portion of the housing support member 510 that faces the flat surface of the housing 505, thereby fixing the housing 505 and the housing support member 510.

FIG. 16 illustrates a coupling portion between the housing 505 and the housing support member 510 using the adhesive 511, and FIG. 17 illustrates a coupling portion between the housing 505 and the housing support member 510 using the adhesive 512.

Since an adhesive having a hardness higher than that of the adhesive 512 illustrated in FIG. 17 is used as the adhesive 511 illustrated in FIG. 16, the adhesive 511 has a function of securing the strength by fixing one end portions of the housing 505 and the housing support member 510 in the longitudinal direction. In the present embodiment, CHEMISEAL U-1542J manufactured by CHEMITECH INC., which is an ultraviolet curable resin, is used as the adhesive 511, and a hardness of an adhesive cured product is 80 (test method: JIS K 7215 Shore D), and a tensile strength is 16 MPa (test method: JIS K 6251 JIS dumbbell No. 2).

Meanwhile, since an adhesive having a hardness lower than that of the adhesive 511 illustrated in FIG. 16 is used as the adhesive 512 illustrated in FIG. 17, the adhesive 512 has a function of reducing deformation of the other end portions in the longitudinal direction due to the thermal expansion difference between the housing 505 and the housing support member 510. In the present embodiment, for example, 3017F manufactured by ThreeBond Holdings Co., Ltd. is used as the adhesive 512, and a hardness of an adhesive cured product is 58/59 (test method: 3TS-215-01), and a tensile strength is 3.4/3.2 (test method: 3TS-301-13, reference material: ZnDc/glass).

The adhesive 511 and the adhesive 512 are applied so as to bridge between objects to be fixed rather than being applied to a flat surface, thereby increasing the adhesive strength. Therefore, in the present embodiment, as illustrated in FIG. 16, the adhesive 511 filling between the one ends of the housing 505 and the housing support member 510 in the longitudinal direction is applied so as to bridge between the housing support member 510 and the first positioning pin 508 along the flat surface of the housing 505. In other words, the adhesive 511 fixing the one ends of the housing 505 and the housing support member 510 in the longitudinal direction is applied so as to fill a gap between the housing support member 510 and the first positioning pin 508. As illustrated in FIG. 17, the adhesive 512 filling between the other ends of the housing 505 and the housing support member 510 in the longitudinal direction is applied so as to bridge between the housing support member 510 and second positioning pin 509 along the flat surface of the housing 505. In other words, the adhesive 512 fixing the other ends of the housing 505 and the housing support member 510 in the longitudinal direction is applied so as to fill a gap between the housing support member 510 and the second positioning pin 509. In this way, the adhesives are applied so as to bridge between objects to be fixed, thereby increasing the adhesive strength.

In the present embodiment, an adhesive having a high hardness is used as the adhesive 511 for fixing the one ends in the longitudinal direction, and an adhesive having a low hardness is used as the adhesive 512 for fixing the other ends in the longitudinal direction. This is because the exposure head 104 is positioned on the body with reference to the positioning pin 508 on the front side of the apparatus.

Specifically, as described above, the image forming apparatus 100 includes the positioning member 250 for positioning the exposure head 104 with respect to the image forming apparatus 100. The positioning member 250 is attached to one end side of the exposure head 104 in the longitudinal direction. An adhesive having a higher hardness than the adhesive 512 for fixing the other ends in the longitudinal direction is used as the adhesive 511 for fixing the one ends in the longitudinal direction, and the adhesive 511 having a higher hardness than the adhesive 512 is used on the same side as the positioning member 250 in the image forming apparatus 100.

That is, the one ends of the housing 505 and the housing support member 510 in the longitudinal direction, which is a positioning side (front side) of the image forming apparatus 100, are fixed using the adhesive 511 having a higher hardness than the adhesive 512. As a result, the housing 505 and the housing support member 510 can be fixed on the front side that is the positioning side of the image forming apparatus to secure the strength, and the exposure head 104 can be positioned in close proximity to a standard for extension due to thermal expansion.

As a method of applying the adhesive, a liquid agent can be precisely applied using a dispenser or the like. As a nozzle/needle at an outlet, SNA-12G manufactured by Musashi Engineering, Inc. or the like is used.

In addition, a method of fixing the housing 505 and the housing support member 510 of the exposure head 104 described above is the same for the respective colors (exposure heads 104Y, 104M, 104C, and 104K). As a result, deformation at the time of thermal expansion can be suppressed in the exposure heads 104Y, 104M, 104C, and 104K of the respective colors, and thus, color misalignment of the respective colors can be effectively suppressed.

As described above, an adhesive having a higher hardness than the adhesive 512 for fixing the other ends in the longitudinal direction is used as the adhesive 511 for fixing the one ends in the longitudinal direction, and thus, the adhesive 511 has a function of securing the strength by fixing the housing 505 and the housing support member 510. On the other hand, an adhesive having a lower hardness than the adhesive 511 for fixing the one ends in the longitudinal direction is used as the adhesive 512 for fixing the other ends in the longitudinal direction, and thus, the adhesive 512 has a function of reducing deformation of the housing 505 and the housing support member 510 due to thermal expansion. That is, according to the present embodiment, it is possible to achieve both high assemblability of the exposure head, the strength required for positioning, and the reduction of the deformation of the substrate and the lens array due to the thermal expansion difference.

Second Embodiment

Figure 18:
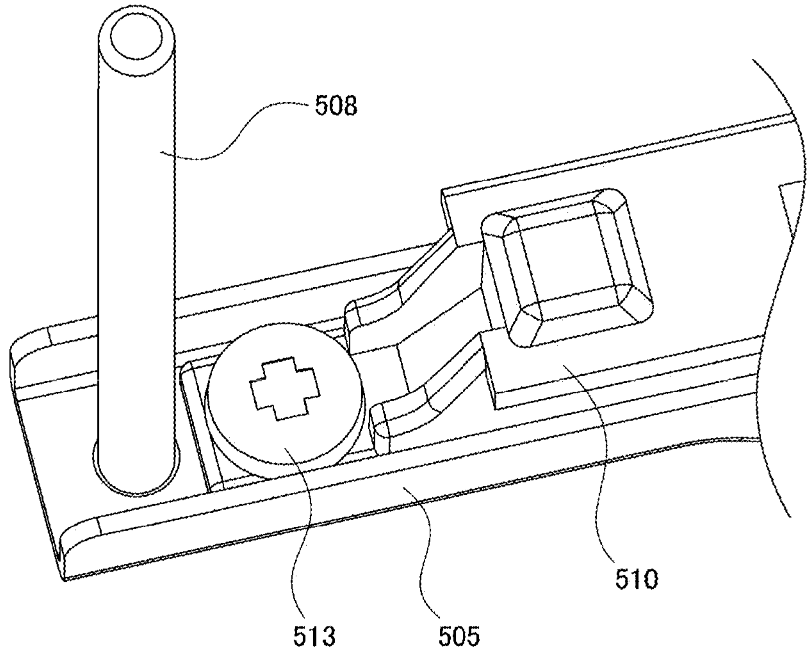
FIG. 18 is a perspective view illustrating one coupling portion between a housing and a housing support member according to a second embodiment.

An exposure head according to a second embodiment will be described with reference to FIG. 18. FIG. 18 is a perspective view illustrating one coupling portion between a housing and a housing support member according to the second embodiment. Other configurations except for a configuration of the coupling portion between the housing and the housing support member in the exposure head are the same as those in the above-described embodiment, and thus a description thereof is omitted here. In addition, members having the same functions as those of the above-described embodiment are denoted by the same reference numerals, and a description thereof will be omitted.

In the above-described embodiment, the configuration in which the first coupling member that fixes the one ends of the housing 505 and the housing support member 510 in the longitudinal direction in the exposure head 104 is the adhesive 511 has been exemplified, but the present invention is not limited thereto.

In the present embodiment, a first coupling member that fixes one ends of a housing 505 and a housing support member 510 in a longitudinal direction in an exposure head 104 is a screw 513 that is an example of a fastening member that fastens the housing 505 and the housing support member 510. That is, the screw 513 having a higher hardness than an adhesive 512 for fixing the other ends of the housing 505 and the housing support member 510 in the longitudinal direction is used as the first coupling member for fixing the one ends in the longitudinal direction to fix the housing 505 and the housing support member 510. Here, the screw 513 is exemplified as an example of the fastening member, but the present invention is not limited thereto.

According to the present embodiment, the one ends of the housing 505 and the housing support member 510 in the longitudinal direction on a front side of an image forming apparatus 100 are fastened by the screw 513, whereby the housing 505 and the housing support member 510 can be fixed and a strength can be secured.

Also in the present embodiment, since the one ends of the housing 505 and the housing support member 510 in the longitudinal direction are fixed by the adhesive 512 having a lower hardness than the screw 513, deformation due to a thermal expansion difference between the housing 505 and the housing support member 510 can be reduced.

Third Embodiment

Figure 19:
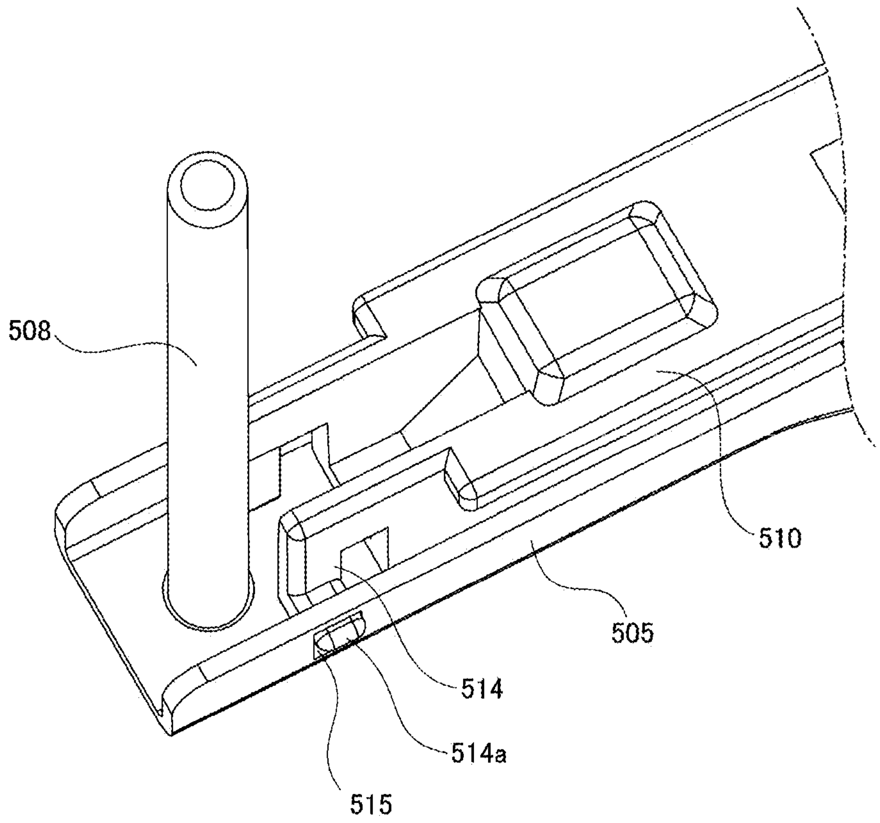
FIG. 19 is a perspective view illustrating one coupling portion between a housing and a housing support member according to a third embodiment.

An exposure head according to a third embodiment will be described with reference to FIG. 19. FIG. 19 is a perspective view illustrating one coupling portion between a housing and a housing support member according to the third embodiment. Other configurations except for a configuration of the coupling portion between the housing and the housing support member in the exposure head are the same as those in the above-described embodiments, and thus a description thereof is omitted here. In addition, members having the same functions as those of the above-described embodiments are denoted by the same reference numerals, and a description thereof will be omitted.

In the present embodiment, a first coupling member that fixes one ends of a housing 505 and a housing support member 510 in a longitudinal direction in an exposure head 104 is a fitting member 514 that is fitted to the housing 505. That is, the fitting member 514 having a higher hardness than an adhesive 512 for fixing the other ends of the housing 505 and the housing support member 510 in the longitudinal direction is used as the first coupling member for fixing the one ends in the longitudinal direction to fix the housing 505 and the housing support member 510.

As an example of the fitting member, a projection-shaped fitting member 514 is provided. The fitting member 514 is provided at the one end of the housing support member 510 in the longitudinal direction. The fitting member 514 is a projection-shaped member that protrudes toward one side (a left side in this case) in a left-right direction orthogonal to an axial direction (front-back direction) of a photosensitive drum and is long in the axial direction of the photosensitive drum. The fitting member 514 has a protrusion 514*a* protruding toward the housing 505 in the left-right direction as a projection-shaped portion. In the fitting member 514, the protrusion 514*a* is fitted into a hole 515 provided in the housing 505. The hole 515 of the housing 505 is provided at a position facing the fitting member 514 of the housing support member 510, and is a long hole extending in an axial direction of the photosensitive drum 102 similarly to the protrusion 514*a* that is the projection-shaped portion of the fitting member 514.

As the protrusion 514*a* of the fitting member 514 of the housing support member 510 is inserted into the hole 515 of the housing 505, the housing support member 510 is fixed to the housing 505.

Specifically, when the housing support member 510 is assembled to the housing 505 from below, the fitting member 514 of the housing support member 510 enters the inside of the housing 505 while being bent. When the housing support member 510 is further assembled to the housing 505, the protrusion 514*a* of the fitting member 514 reaches the hole 515 of the housing 505, and is positioned and fixed in the hole 515 while being unbent.

The one ends of the housing 505 and the housing support member 510 in the longitudinal direction are fixed by fitting of the protrusion 514*a* of the fitting member 514 and the hole 515 to ensure a strength. Fixing in a lateral direction (left-right direction) and a vertical direction (upward-downward direction) orthogonal to the longitudinal direction (front-back direction) is not made by the protrusion 514*a* of the fitting member 514 and the hole 515.

According to the present embodiment, the one ends of the housing 505 and the housing support member 510 in the longitudinal direction on a front side of an image forming apparatus 100 are fixed by the fitting member 514, whereby the housing 505 and the housing support member 510 can be fixed and the strength can be secured.

Also in the present embodiment, since the one ends of the housing 505 and the housing support member 510 in the longitudinal direction are fixed by the adhesive 512 having a lower hardness than the fitting member 514, deformation due to a thermal expansion difference between the housing 505 and the housing support member 510 can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-114886, filed Jul. 13, 2023, which is hereby incorporated by reference herein in its entirety.

What is claimed is:

1. An exposure device that has an elongated shape extending in an axial direction of a photosensitive member and exposes the photosensitive member, the exposure device comprising:

a substrate on which a plurality of light emitting elements that emits light to expose the photosensitive member is arranged in the axial direction;

a lens array configured to collect the light emitted from the light emitting elements on the photosensitive member;

a housing configured to hold the substrate and the lens array; and a housing support member configured to support the housing, wherein one ends of the housing and the housing support member in a longitudinal direction are bonded with a first adhesive, the other ends of the housing and the housing support member in the longitudinal direction are bonded with a second adhesive, and a hardness of the first adhesive after curing is higher than a hardness of the second adhesive after curing.

2. The exposure device according to claim 1, wherein the first adhesive fills between the housing and the housing support member to fix the housing and the housing support member, and the second adhesive fills between the housing and the housing support member to fix the housing and the housing support member.

3. The exposure device according to claim 1, further comprising: a first positioning pin provided on one side of the housing in the axial direction and configured to come into contact with the photosensitive member to define a distance between the photosensitive member and the exposure device; and a second positioning pin provided on the other side of the housing in the axial direction and configured to come into contact with the photosensitive member to define the distance between the photosensitive member and the exposure device.

4. The exposure device according to claim 3, wherein the first adhesive is applied so as to bridge between the one end of the housing and the first positioning pin in the longitudinal direction, and the second adhesive is applied so as to bridge between the other end of the housing and the second positioning pin in the longitudinal direction.

5. The exposure device according to claim 3, wherein the exposure device is configured to move between an exposure position where the photosensitive member is exposed and a retracted position where the exposure device is retracted from the photosensitive member.

6. The exposure device according to claim 5, wherein in a case where the exposure device is at the exposure position, the first positioning pin and the second positioning pin come into contact with the photosensitive member, and in a case where the exposure device is at the retracted position, the first positioning pin and the second positioning pin do not come into contact with the photosensitive member.

7. The exposure device according to claim 1, wherein the housing support member has a larger linear expansion coefficient than the housing.

8. The exposure device according to claim 1, wherein the housing is a metal member.

9. The exposure device according to claim 8, wherein the housing support member is made of a resin.

10. The exposure device according to claim 1, wherein the housing support member has an opening at a position facing a back surface of the substrate that is opposite to a surface of the substrate on which the light emitting elements are mounted, and forms a duct that causes an airflow blown onto the back surface of the substrate through the opening to flow in a longitudinal direction of the substrate.

11. The exposure device according to claim 1, wherein the plurality of light emitting elements is organic ELs.

12. An image forming apparatus comprising: a photosensitive member; an exposure head configured to expose the photosensitive member; and an exposure cooling unit communicating with the exposure head and configured to cool the exposure head with an airflow, wherein the exposure device according to claim 1 is provided as the exposure head.

13. The image forming apparatus according to claim 12, further comprising a positioning member attached to one end side of the exposure head in a longitudinal direction and configured to position the exposure head with respect to the image forming apparatus, wherein the first adhesive having a higher hardness than the second adhesive is used on the same side as the positioning member in the image forming apparatus.

14. The image forming apparatus according to claim 12, wherein the image forming apparatus comprises a plurality of the photosensitive members and a plurality of the exposure heads, and the first adhesive and the second adhesive are common to the plurality of exposure heads.

* * * * *